(12) United States Patent
Baek et al.

(10) Patent No.: US 10,923,963 B2
(45) Date of Patent: Feb. 16, 2021

(54) FOREIGN OBJECT DETECTION APPARATUS AND WIRELESS CHARGING SYSTEM INCLUDING THE SAME

(71) Applicant: LG ELECTRONICS INC., Seoul (KR)

(72) Inventors: Jongseok Baek, Seoul (KR); Byunghyuk Lee, Seoul (KR); Yongnam Cho, Seoul (KR); Bohwan Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 196 days.

(21) Appl. No.: 16/038,625

(22) Filed: Jul. 18, 2018

(65) Prior Publication Data
US 2019/0027973 A1  Jan. 24, 2019

(30) Foreign Application Priority Data

Jul. 19, 2017 (KR) .................. 10-2017-0091680

(51) Int. Cl.
| | | |
|---|---|---|
| *H02J 50/60* | (2016.01) | |
| *B60L 53/122* | (2019.01) | |
| *B60L 53/124* | (2019.01) | |
| *B60L 53/126* | (2019.01) | |
| *H02J 50/80* | (2016.01) | |
| *H02J 50/12* | (2016.01) | |
| *H02J 7/02* | (2016.01) | |

(52) U.S. Cl.
CPC ............ *H02J 50/60* (2016.02); *B60L 53/122* (2019.02); *B60L 53/124* (2019.02); *B60L 53/126* (2019.02); *H02J 7/025* (2013.01); *H02J 50/12* (2016.02); *H02J 50/80* (2016.02)

(58) Field of Classification Search
CPC ............ H02J 50/60; H02J 50/80; H02J 50/12
USPC ......................................................... 307/104
See application file for complete search history.

(56) References Cited

U.S. PATENT DOCUMENTS

| | | | | |
|---|---|---|---|---|
| 4,513,257 A | * | 4/1985 | Miyamoto | ............. H03K 17/16 324/236 |
| 2008/0290736 A1 | * | 11/2008 | Onishi | .................... H02J 7/025 307/107 |

(Continued)

FOREIGN PATENT DOCUMENTS

| | | | | |
|---|---|---|---|---|
| DE | 102013219131 A1 | * | 3/2015 | ............. H02J 50/60 |
| JP | 2013-192390 A | | 9/2013 | |

(Continued)

*Primary Examiner* — Rexford N Barnie
*Assistant Examiner* — Joseph N Inge
(74) *Attorney, Agent, or Firm* — Birch, Stewart, Kolasch & Birch, LLP

(57) ABSTRACT

A foreign object detection apparatus including a plurality of object sensing devices positioned between a transmission pad and a reception pad of a wireless charging system; and a detection circuit configured to determine whether a foreign object is present between the transmission pad and the reception pad based on data received from the plurality of object sensing devices. Further, each of the plurality of object sensing devices includes a first coil unit wound with a first coil in a first direction, and a second coil unit wound with a second coil in a second direction different from the first direction; and the first coil unit and the second coil unit overlap each other.

17 Claims, 32 Drawing Sheets

(56) References Cited

U.S. PATENT DOCUMENTS

| | | | | |
|---|---|---|---|---|
| 2014/0266036 A1* | 9/2014 | Jung | ................ | H02J 50/12 |
| | | | | 320/108 |
| 2015/0311725 A1* | 10/2015 | Yamamoto | ............ | G01V 3/101 |
| | | | | 307/104 |
| 2015/0323694 A1* | 11/2015 | Roy | ................ | B60L 53/124 |
| | | | | 307/104 |
| 2016/0336759 A1* | 11/2016 | Yamamoto | ............ | G01V 3/101 |
| 2018/0097401 A1* | 4/2018 | Gaskill | ............ | H02J 7/0042 |

FOREIGN PATENT DOCUMENTS

| | | |
|---|---|---|
| JP | 2015-533273 A | 11/2015 |
| JP | 2017-34972 A | 2/2017 |

\* cited by examiner

FIG. 1
100
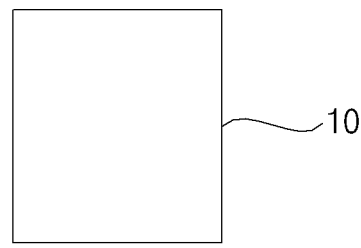
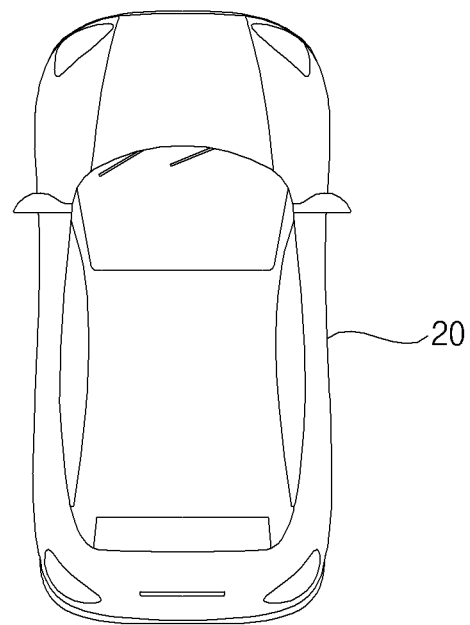

FIG. 8
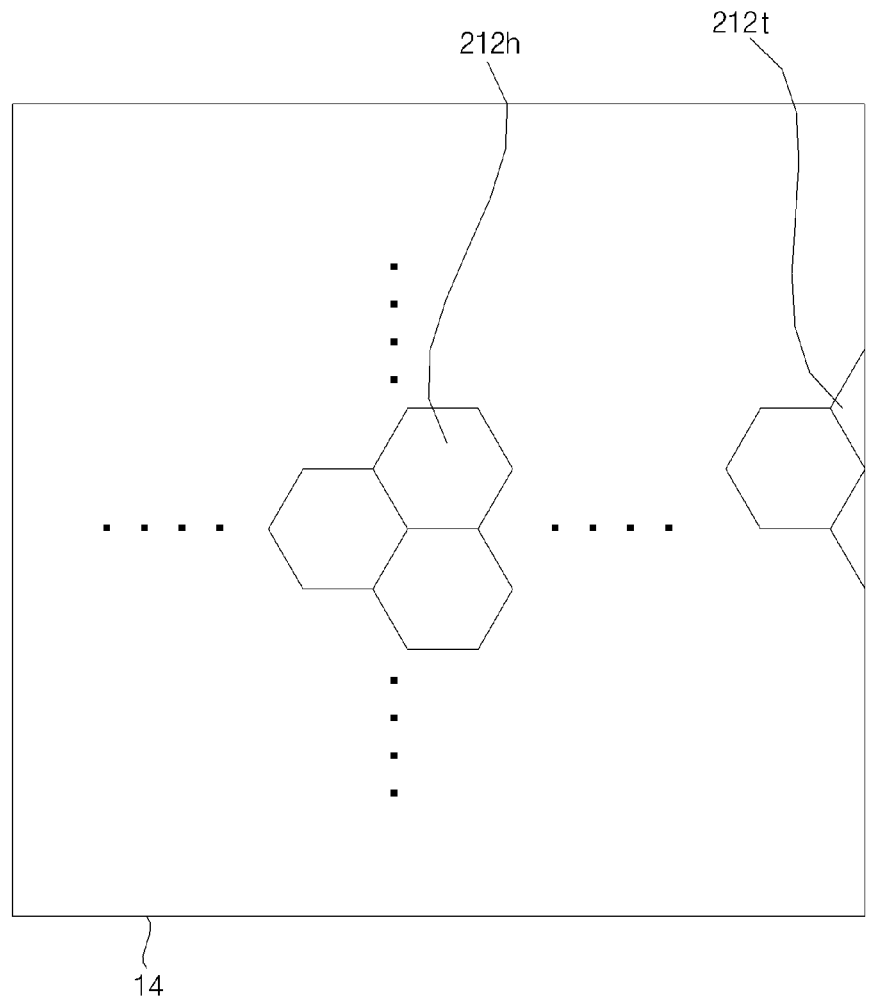
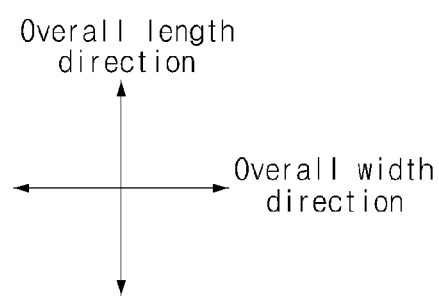

FIG. 9
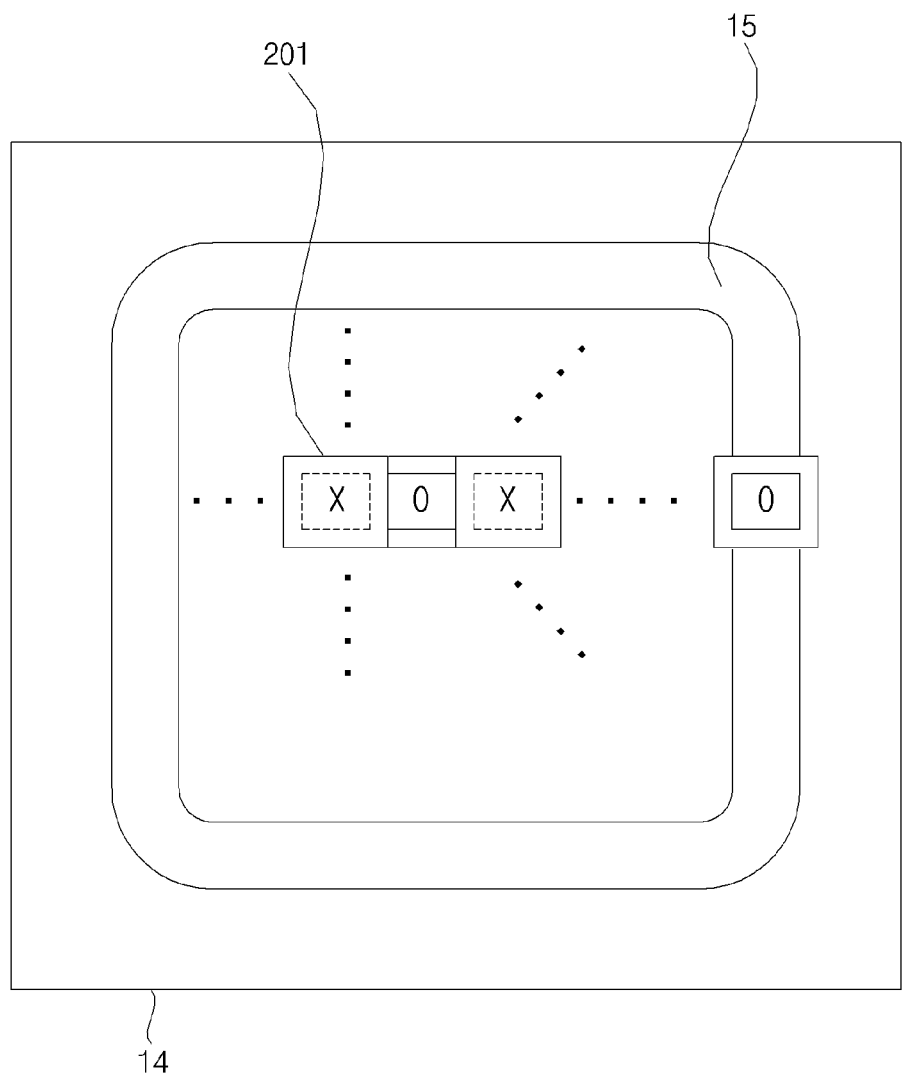
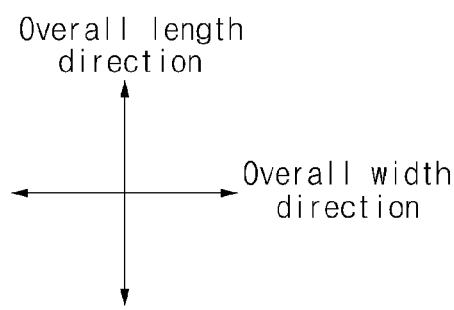

FIG. 10
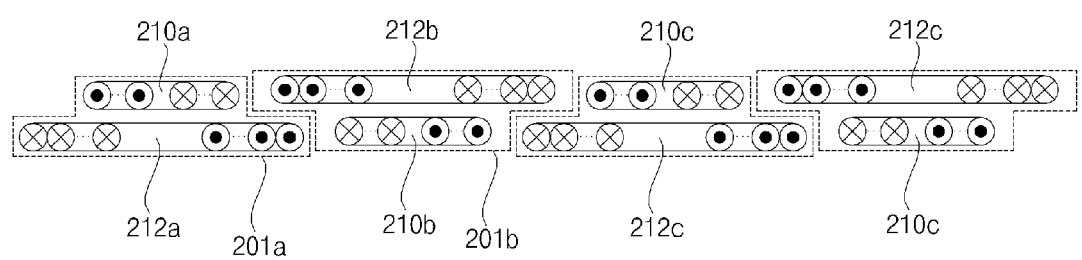
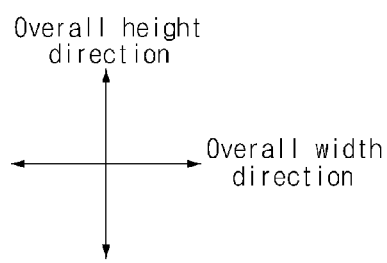

FOREIGN OBJECT DETECTION APPARATUS AND WIRELESS CHARGING SYSTEM INCLUDING THE SAME

CROSS-REFERENCE TO RELATED APPLICATION

This application claims the priority benefit of Korean Patent Application No. 10-2017-0091680, filed on Jul. 19, 2017 in the Korean Intellectual Property Office, the disclosure of which is incorporated herein by reference.

BACKGROUND OF THE INVENTION

1. Field of the Invention

The present invention relates to a foreign object detection apparatus and a wireless charging system including the same.

2. Description of the Related Art

As studies on electric devices have continued, research on a wireless charging system for supplying electric energy to an electric device has also been conducted. With regard to wireless charging systems of mobile terminals and wireless charging systems of electric vehicles, many manufacturers have concentrated on research and development.

During wireless charging, when a metal foreign object is present between a transmission part and a reception part, the temperature of a wireless charging system may be raised and thus the wireless charging system may be in danger of starting a fire. To detect such a foreign object, although various types of foreign object detection schemes such as camera installation have been introduced, reliability of detection is problematic.

SUMMARY OF THE INVENTION

Therefore, the present invention has been made in view of the above problems, and it is an object of the present invention to provide a foreign object detection apparatus used in a low-cost wireless charging system while maintaining reliability of foreign object detection.

It is another object of the present invention to provide a wireless charging system including the foreign object detection apparatus.

The objects of the present invention are not limited to what has been particularly described hereinabove and other objects not described herein will be more clearly understood by persons skilled in the art from the following description.

In accordance with the present invention, the above and other objects can be accomplished by the provision of a foreign object detection apparatus, including a plurality of object sensing devices positioned between a transmission pad and a reception pad of a wireless charging system and a detection circuit configured to determine whether an object is present based on data received from the plural object sensing devices, wherein each of the plural object sensing devices includes a first coil unit wound with a coil in a first direction and a second coil unit wound with a coil in a second direction different from the first direction, and wherein the first coil unit and the second coil unit are deposited on each other.

Details of other embodiments are included in the following description and the drawings.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view illustrating an outer appearance of a wireless charging system according to an embodiment of the present invention;

FIG. 8 is a diagram illustrating a shape of a second coil unit according to an embodiment of the present invention;

FIG. 9 is a diagram illustrating an object sensing device on a charging pad according to an embodiment of the present invention;

FIG. 10 is a diagram illustrating a plurality of object sensing devices according to an embodiment of the present invention;

DETAILED DESCRIPTION OF THE PREFERRED EMBODIMENTS

Figure 2:
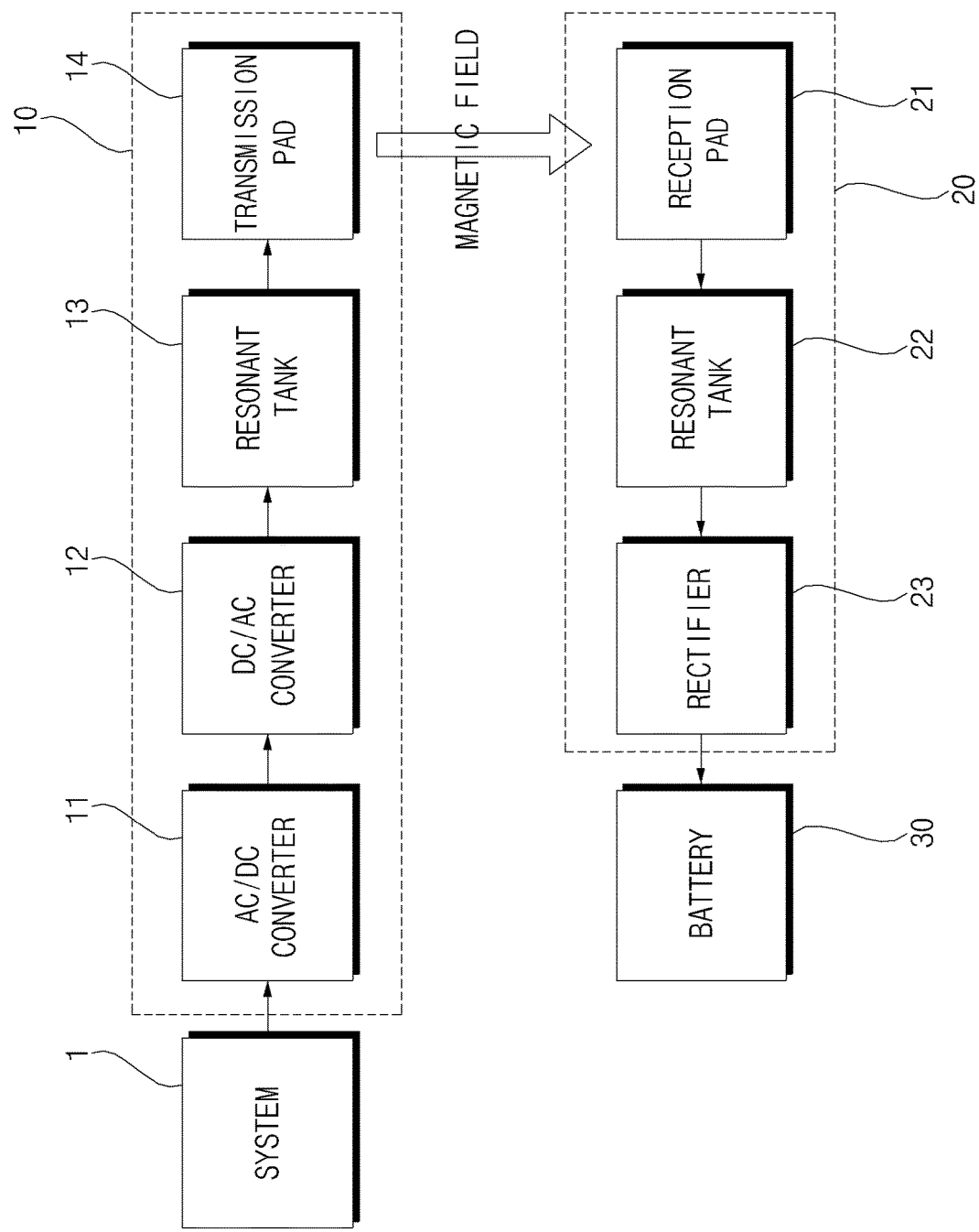
FIG. 2 is a block diagram of a wireless charging system according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given only in consideration of facilitation of description and do not have particular meanings or functions. In addition, the accompanying drawings are provided for a better understanding of the embodiments disclosed in the present specification and are not intended to limit technical ideas disclosed in the present specification. Therefore, it should be understood that the accompanying drawings include all modifications, equivalents and substitutions within the scope and spirit of the present invention.

Although the terms first, second, etc., may be used herein to describe various components, these components should not be limited by these terms. These terms are only used to distinguish one component from another component. When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

The singular form is intended to include the plural forms as well, unless context clearly indicates otherwise. In the present application, it will be further understood that the terms "comprises", "includes", etc. specify the presence of stated features, numerals, steps, operations, elements, components, or combinations thereof, but do not preclude the presence or addition of one or more other features, numerals, steps, operations, elements, components, or combinations thereof.

The term "vehicle" employed in this specification may include an automobile or a motorcycle. Hereinafter, description will be given mainly focusing on an automobile by way of example. The vehicle described in this specification may include an internal combustion vehicle equipped with an engine as a power source, a hybrid vehicle equipped with both an engine and an electric motor as a power source, and an electric vehicle equipped with an electric motor as a power source.

In the description below, the left side of the vehicle means the left side with respect to the traveling direction of the vehicle and the right side of the vehicle means the right side with respect to the traveling direction of the vehicle. An overall length refers to a length from the front part to the rear part of a vehicle, an overall width refers to a width of the vehicle, and an overall height refers to a length from the bottom of a wheel to a roof of the vehicle. In the following description, an overall length direction L may mean a reference direction for measuring the overall length of the vehicle, an overall width direction W may mean a reference direction for measuring the width of the vehicle, and an overall height direction H may mean a reference direction for measuring the height of the vehicle.

Referring to FIGS. 1 and 2, a wireless charging system 100 may include a power transmission device 10 and a power reception device 20. The wireless charging system 100 may be used for wireless charging of an electric vehicle battery, wireless charging of a mobile terminal battery, and the like. When the wireless charging system 100 is used for wireless charging of the electric vehicle battery, the power transmission device 10 may be installed in a charging station and the power reception device 20 may be mounted in the interior of a vehicle. When the wireless charging system 100 is used for wireless charging of the mobile terminal battery, the power transmission device 10 may be portable and the power reception device 20 may be mounted in the interior of a mobile terminal.

In some embodiments, the power transmission device 10 may be installed in the interior of a vehicle, so that the power transmission device 10 may constitute the wireless charging system 100 together with a mobile terminal including the power reception device 20 therein. As shown in FIG. 2, the power transmission device 10 includes an alternating current (AC)/direct current (DC) converter 11, a DC/AC converter 12, a resonant tank 13, and a transmission pad 14.

The AC/DC converter 11 can convert electric energy of an AC type provided by a system 1 into electric energy of a DC type. The DC/AC converter 12 converts electric energy of a DC type into electric energy of an AC type and can generate a high-frequency signal of a few tens of kHz to a few hundred kHz.

Further, the resonant tank 13 corrects impedance to be suitable for wireless charging. The transmission pad 14 wirelessly transmits electric energy and includes a transmission coil therein. As shown, the power reception device 20 includes a reception pad 21, a resonant tank 22, and a rectifier 23.

The reception pad 21 wirelessly receives electric energy and includes a reception coil therein. The transmission pad 14 and the reception pad 21 includes the transmission coil and the reception coil, respectively, which forms a coil set having magnetic coupling. Further, the transmission pad 14 and the reception pad 21 transfer electric energy using, as a medium, a magnetic field which occurs due to a high-frequency driving signal, without any electrical contact between physical electrodes.

When a metallic foreign object is present between the transmission pad 14 and the reception pad 21, eddy current loss occurs. Then, there is danger of fire. In addition, the resonant tank 22 corrects impedance to be suitable for wireless charging, and the rectifier 21 converts electric energy of an AC type into electric energy of a DC type in order to supply electric energy of the DC type to a battery 30. The battery 30 may be mounted in a vehicle or a mobile terminal.

Figure 3:
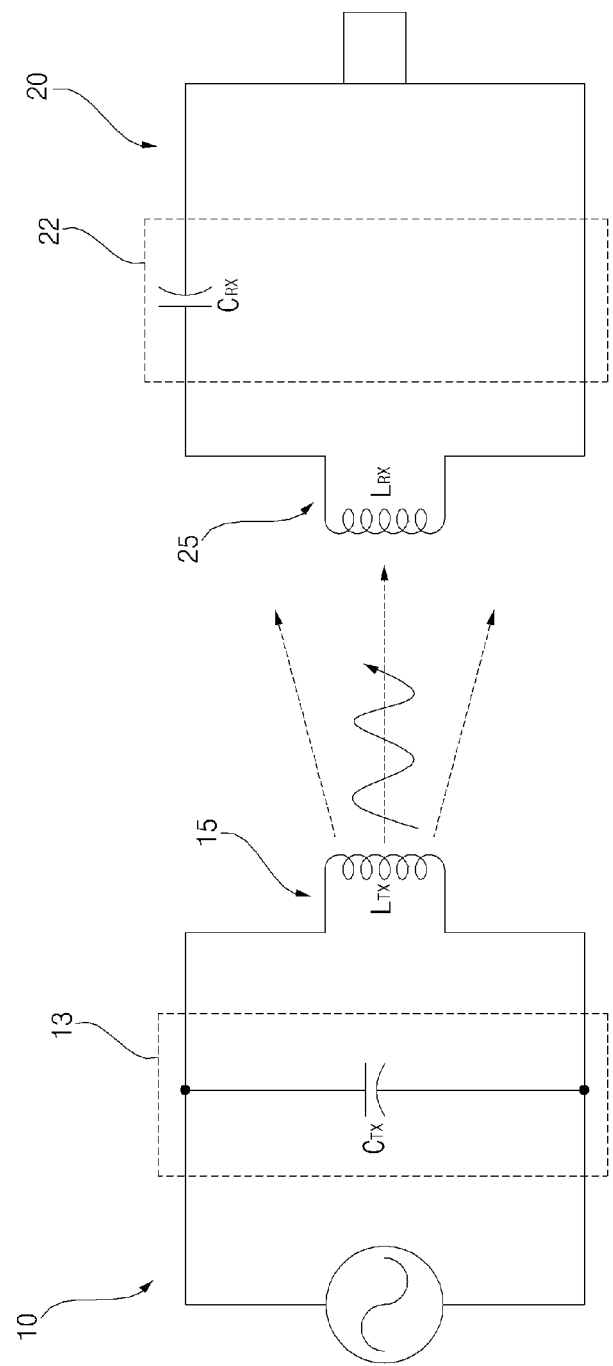
FIG. 3 is a diagram illustrating a wireless charging scheme according to an embodiment of the present invention.

Next, FIG. 3 is a view illustrating a wireless charging scheme according to an embodiment of the present invention. Referring to FIG. 3, a wireless charging system can use an inductive coupling scheme or a resonance coupling scheme.

In more detail, the inductive coupling scheme uses the following principle. If the strength of current flowing into a primary coil of two adjacent coils varies, a magnetic field varies by such current and then magnetic flux passing through a secondary coil varies, so that induced electromotive force is generated in the side of the secondary coil. That is, according to this scheme, the induced electromotive force is generated only if the current of the primary coil varies while the two coils are in proximity to each other even without the necessity of spatially moving two conductive lines. In this instance, although frequency characteristics are not greatly affected, power efficiency is affected according to alignment and distance between a transmission device (e.g., a wireless charging apparatus) and a reception device (e.g., a mobile terminal) including respective coils.

The resonance coupling scheme uses a principle in which a secondary coil generates an induced electromotive force when a part of the amount of variations in magnetic field, which is generated by applying a resonant frequency to a primary coil of two coils separated by a predetermined distance, is applied to the secondary coil of the same resonant frequency. That is, according to this scheme, when transmission and reception devices resonate at the same frequency, electromagnetic waves are transferred through a near-field electromagnetic field.

Therefore, energy is not transferred in different frequencies. In this instance, frequency selection can be an important issue. Since energy is not transferred in resonant frequencies separated by a predetermined distance or more, a charging target device may be selected through selection of a resonant frequency. If only one device is allocated with respect to one resonant frequency, selection of the resonant frequency can be selection of a charging target device. The resonance coupling scheme is advantageous relative to the inductive coupling scheme in that alignment and distance between the transmission device and the reception device including respective coils less affect power efficiency.

Figure 4:
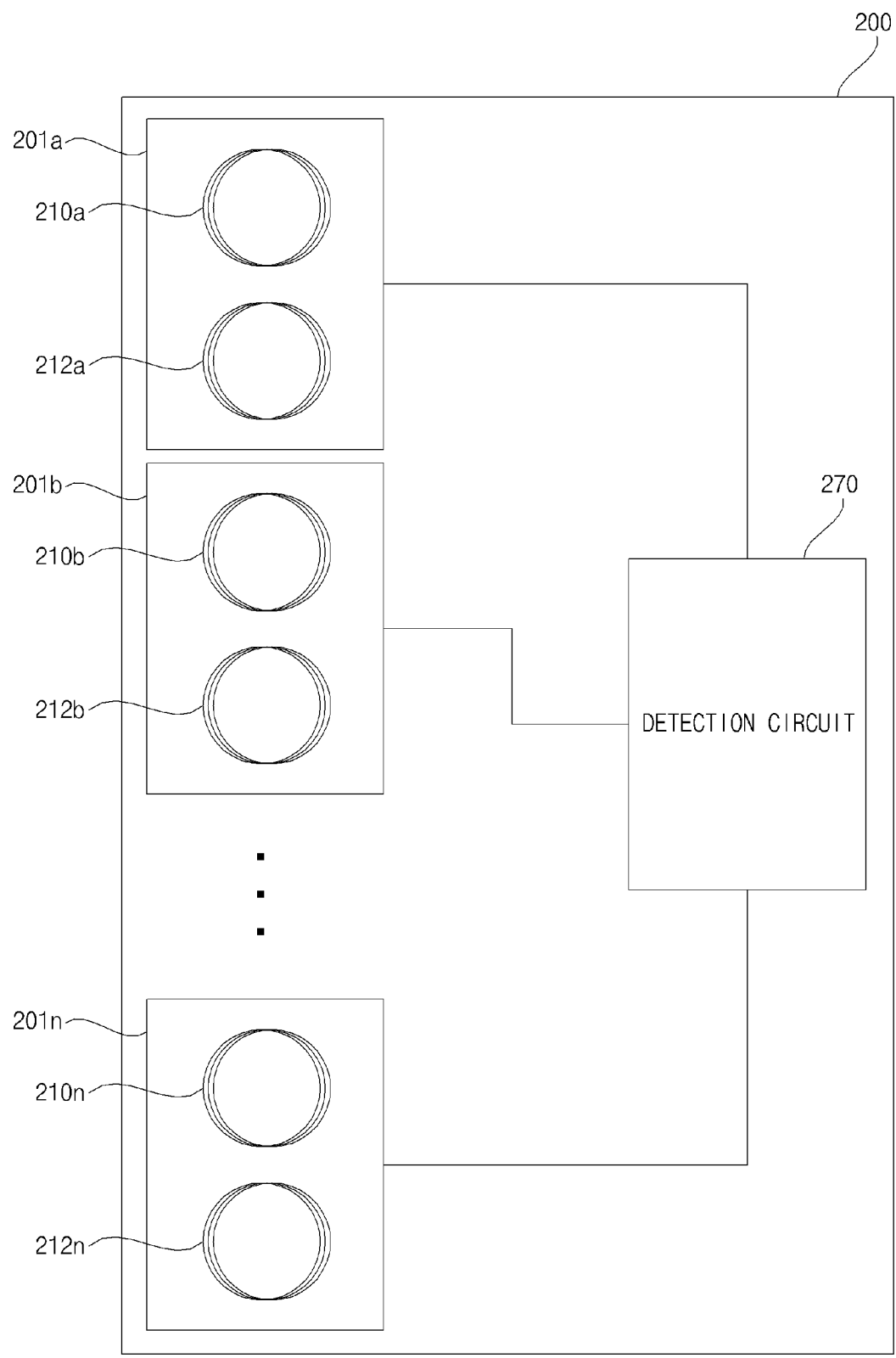
FIG. 4 is a diagram illustrating a foreign object detection apparatus according to an embodiment of the present invention.
Figure 5:
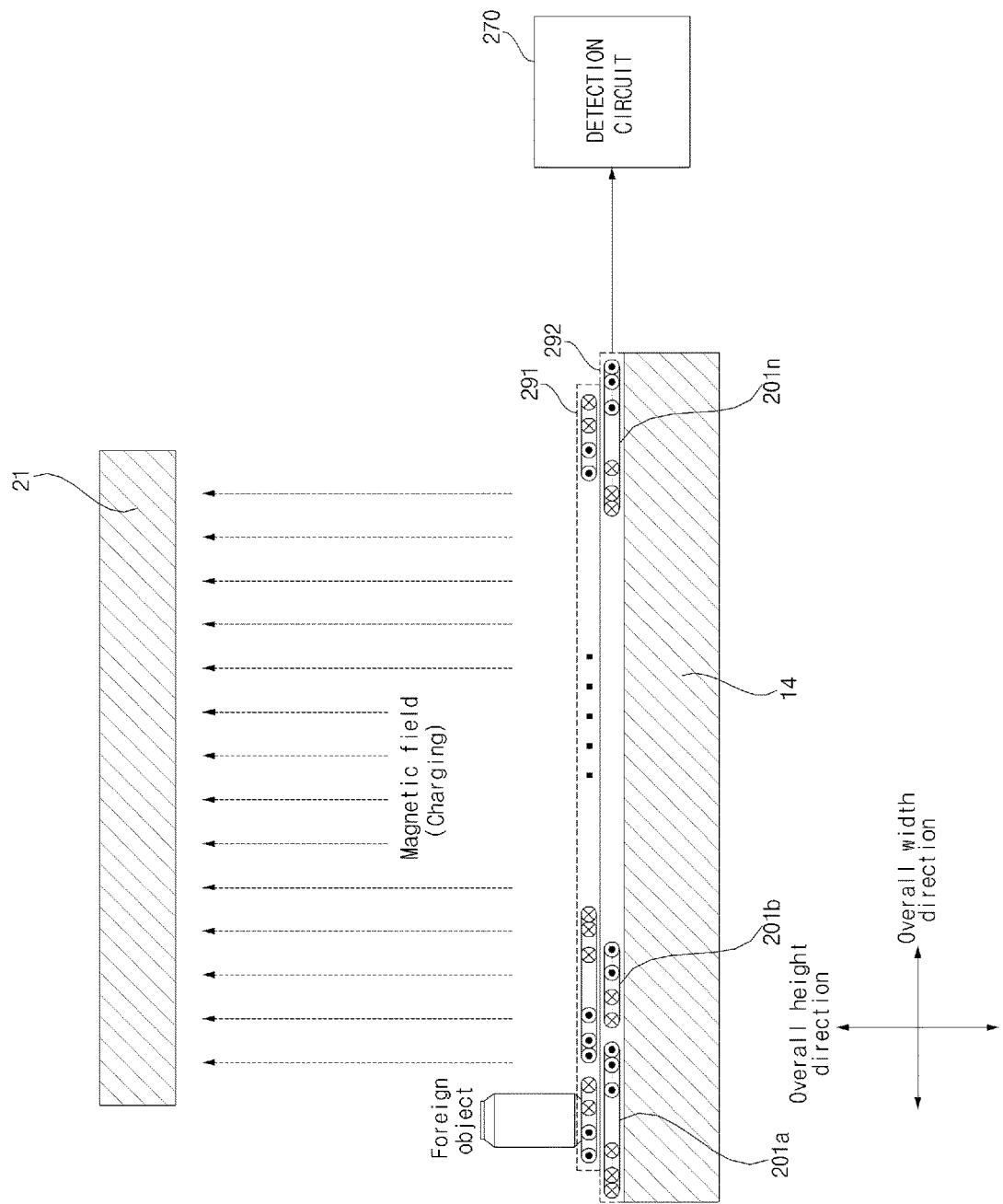
FIG. 5 is a diagram illustrating a configuration of a foreign object detection apparatus according to an embodiment of the present invention.

Next, FIG. 4 is a diagram illustrating a foreign object detection apparatus according to an embodiment of the present invention, and FIG. 5 is a diagram illustrating a configuration of a foreign object detection apparatus according to an embodiment of the present invention.

Referring to FIGS. 4 and 5, a foreign object detection apparatus 200 may include a plurality of object sensing devices 201a, 201b, . . . , 201n (hereinafter, 201) and a detection circuit 270. The plural object sensing devices 201 may be positioned between the transmission pad 14 and the reception pad 21.

For example, the plural object sensing devices 201 can be disposed on the transmission pad 14 and disposed on the reception pad 21. The plural object sensing devices 201 can also cover the transmission pad 14. For example, the transmission pad 14 may be formed of a quadrangle. Second coil units 212 of the plural object sensing devices 201 may be formed of a polygon. The whole entirety of the transmission pad 14 having a quadrangular shape can be covered with the plural object sensing devices 201 having a polygonal shape.

In addition, the reception pad 21 may be formed of a quadrangle, and the second coil units 212 of the plural object sensing devices 201 can be formed of a polygon. The entirety of the reception pad 12 having a quadrangular shape can be covered with the plural object sensing devices 201 having a polygonal shape.

Further, the plural object sensing devices 201 can sense an object. Herein, the object can be defined as a metallic foreign object positioned between the transmission pad 14 and the reception pad 21. If the metallic foreign object is present between the transmission pad 14 and the reception pad 21, charging may not be smoothly performed and degradation occurs, thereby resulting in a safety problem.

As shown in FIG. 4, the plural object sensing devices 201 can include respective first coil units 210a, 210b, . . . , 210n (hereinafter, a first coil unit 210) and respective second coil units 212a, 212b, . . . , 212n (hereinafter, a second coil unit 212). The first coil unit 210 includes a coil wound in a first direction and is wound with a coil by a predetermined number of windings in the first direction.

In addition, the first coil unit 210 can be wound with a coil by a larger number of windings than the second coil unit 212. For example, the number of windings of the first coil unit 210 can be determined based on a value obtained by multiplying the ratio between the area of a first shape and the area of a second shape by the number of windings of the second coil unit 212. The first shape can also be defined by windings of the coil of the first coil unit 210 and the second shape can be defined by windings of the coil of the second coil unit 212.

Further, the second coil unit 212 can be wound with a coil in a second direction different from the first direction. The second coil unit 212 can also be wound with a coil in the second direction by a predetermined number of windings. In addition, the number of windings can be referred to as a turn. The second coil unit 212 can also form a second layer.

The first coil unit 210 and the second coil unit 212 can be deposited on each other. For example, the second coil unit 212 can be deposited on the first coil unit 210. For example, the first coil unit 210 can be deposited on the second coil unit 212. For example, the first coil unit 210 and the second coil unit 212 can be deposited so the center of the first shape defined by windings of the coil of the first coil unit 210 and the center of the second shape defined by windings of the coil of the second coil unit 210 match. That is, a virtual line connecting the center of the first shape to the center of the second shape can be perpendicular to the ground.

Further, the plural object sensing devices can include a plurality of layers. For example, the first coil unit 210 can be alternately deposited with the second coil unit 212 to form a first layer 291, and the second coil unit 212 can be alternately deposited with the first coil unit 210 to form a second layer 292.

When the first coil unit 210 is disposed at a first point of the first layer 291, the second coil unit 212 can be disposed at a second point corresponding to the first point. In this instance, the center of the first shape of the first coil unit 210 and the center of the second shape of the second coil unit 212 match.

When the second coil unit 212 is disposed at the first point of the first layer 291, the first coil unit 210 can be disposed at the second point of the second layer 292 corresponding to the first point. In this instance, the center of the second shape of the second coil unit 212 and the center of the first shape of the first coil unit 210 match.

In addition, the detection circuit 270 is electrically connected to the plural object sensing devices 201 and can determine whether an object is present based on data received from the plural object sensing devices 201. The detection circuit 270 can also determine whether an object is present based on a variation in impedance of the first coil unit 210.

For example, the detection circuit 270 can determine whether an object is present based on an output signal of the first coil unit 210 by an oscillator. That is, the detection circuit 270 can determine whether an object is present based on the output signal of the first coil unit 210 according to switching of a DC voltage. The detection circuit 270 can also determine whether an object is present based on induced voltages generated in the object sensing devices 201.

Since the wireless charging system is equipped with the second coil unit 212, an induced voltage caused by power transmission can be offset. Presence of a foreign object when the induced voltage is offset can generate the induced voltage. In this instance, the detection circuit 270 can determine whether an object is present based on the generated induced voltage.

Figure 6:
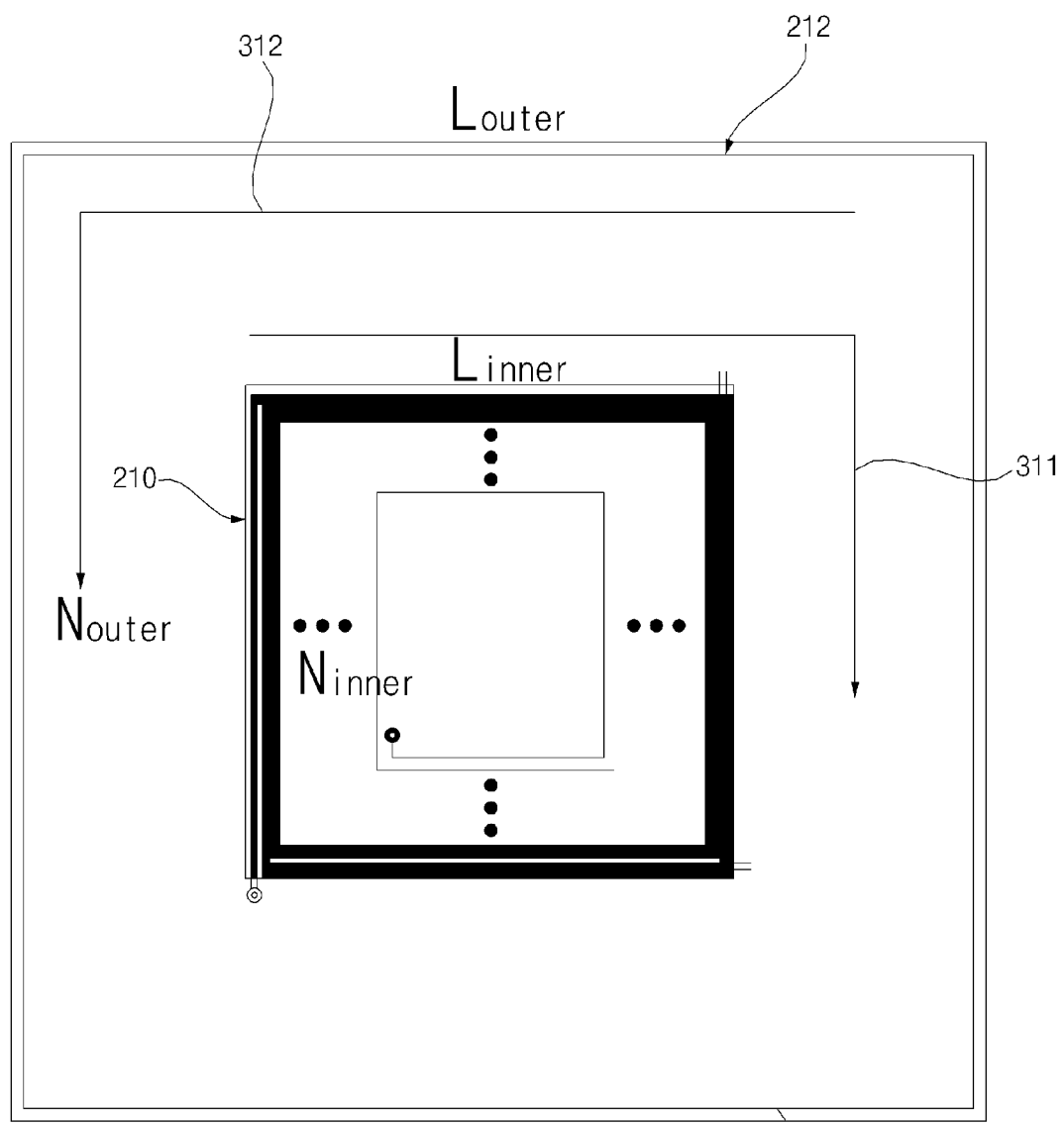
FIG. 6 is a plan view of an object sensing device according to an embodiment of the present invention.
Figure 7:
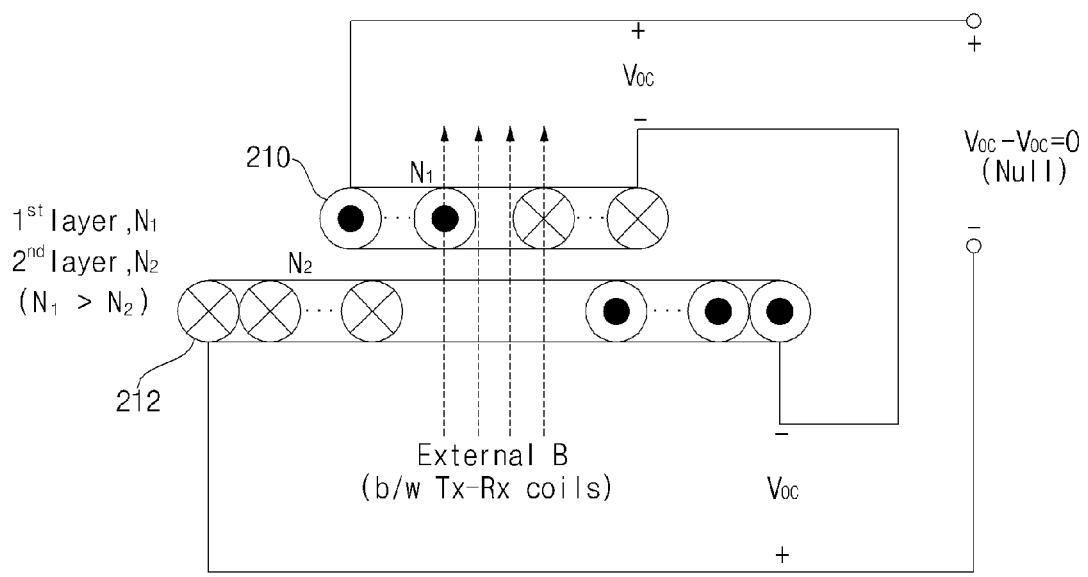
FIG. 7 is a side view of an object sensing device according to an embodiment of the present invention.

Next, FIG. 6 is a plan view and FIG. 7 is a side view of an object sensing device according to an embodiment of the present invention. Referring to FIGS. 6 and 7, the first coil unit 210 can be wound with a coil in a first direction 311. For example, the first direction 311 can be a clockwise direction and the first coil unit 210 can be wound with a coil in the first direction 311 by a predetermined number of windings.

The first coil unit 210 can also be wound with a coil by a larger number of windings than the second coil unit 212. Further, the first coil unit 210 can have a first shape having a first area and defined by windings of a coil in the first coil unit 210.

Although FIG. 6 illustrates a quadrangle as the first shape, the present invention is not limited thereto and the first shape can be a polygon, a circle, or an oval. The first shape can also be smaller than the second shape defined by windings of a coil in the second coil unit 212. That is, the first area can be smaller than the second area.

The number of windings of the first coil unit 210 can be determined by the number of windings of the second coil unit 212. For example, the number of windings of the first coil unit 210 can be determined based on a value obtained by multiplying the ratio between the area of the first shape and the area of the second shape by the number of windings of the coil of the second coil unit 212.

Due to such characteristics, an induced voltage caused by a charging magnetic field is offset and inductance of the object sensing device is not offset, so that sensitivity of an object can be maximized. As illustrated in FIG. 6, the first shape can be a first quadrangle and the length of one side of the first quadrangle can be ½ times one side of the second quadrangle.

In addition, the first shape can be different from the second shape. For example, the first shape can be a quadrangle and the second shape can be a hexagon. The first shape can also be a hexagon and the second shape can be a quadrangle. In another example, the first shape can be a circle and the second shape can be a quadrangle or a hexagon.

The first shape and the second shape can also be determined by object sensing sensitivity and the shapes of the reception pad and the transmission pad. Further, the second coil unit 212 can be wound with a coil in a second direction 312 different from the first direction 311. For example, the second direction 312 can be a counter-clockwise direction.

The second coil unit 212 can be wound with a coil in the second direction 312 by a predetermined number of windings. In addition, the number of windings can be referred to as a turn. The second coil unit 212 may have a second shape having a second area and windings of a coil in the second coil unit 212.

Although FIG. 6 illustrates a quadrangle as the second shape, the present invention is not limited thereto and the first shape can be a polygon, a circle, or an oval. The second shape can also be larger than the first shape defined by windings of a coil in the first coil unit 210. That is, the second area can be larger than the first area. As illustrated in FIG. 6, the second shape can be a second quadrangle larger than a first quadrangle.

In this way, since the first shape and the second shape have quadrangle shapes, the plural sensing devices 201 can cover the entirety of the transmission pad 14 and the reception pad 21 having rectangular shapes. The length of one side of the second quadrangle can be twice the length of one side of the first quadrangle.

Due to these characteristics, the transmission pad 14 and reception pad 21 having quadrangular shapes can be covered without having a dead zone. Herein, the dead zone may be a region in which an object is not sensed. The second coil unit 212 can also be wound with a coil in a region except for a region in which the first coil unit 210 is deposited.

Preferably, the second coil unit 212 can be wound with a coil in an outer region of the second shape and be wound with a coil to be separated as much as possible from the first coil unit 210. The second coil unit 212 can also be wound with a coil one to three times. If the second coil unit is wound with a coil four times or more, an entire inductance of the object sensing devices 201 is reduced so that object sensing sensitivity is reduced.

As illustrated in FIG. 7, the number of windings $N_1$ of the first coil unit 210 can be larger than the number of windings $N_2$ of the second coil unit 212. In addition, the area of the second shape of the second coil unit 212 can be larger than the area of the first shape of the first coil unit 210. Then, an induced voltage formed in the object sensing devices 201 by an external magnetic field is offset by a voltage across each of the first coil unit 210 and the second coil unit 212.

Next, FIG. 8 is a diagram illustrating a shape of a second coil unit according to an embodiment of the present invention. Referring to FIG. 8, the transmission pad 14 may have a quadrangular shape, and the second shape defined by windings of a coil in the second coil unit 212 can be at least one of a hexagon or a triangle. Some of the plural object sensing devices 201 can also include second hexagonal coil units 212h.

The others of the plural object sensing devices 210 can include second triangular coil units 212t. Further, a region in which the transmission pad 14 is not covered by the plural hexagonal second coil units 212h can be covered by the plural triangular second coil units 212t. In this way, all of the transmission pad 14 can be covered by arrangement according to combinations of the plural hexagonal second coil units 212h and the plural triangular second coil units 212t. Then, a dead zone in which an object is not sensed is removed and an object sensing rate is raised.

Next, FIG. 9 is a diagram illustrating an object sensing device on a charging pad according to an embodiment of the present invention. Referring to FIG. 9, the transmission pad 14 includes a transmission coil 15, and the number of windings of the first coil unit 210 can be determined by the location of the first coil unit 210 on the transmission pad 14. Further, the number of windings of the first coil unit 210 can be larger when the first coil unit 210 is disposed on the transmission coil 15 of the transmission pad 14 than when the first coil unit 210 is not disposed on the transmission coil 15 of the transmission pad 14.

When the first coil unit 210 is disposed on the transmission coil 15 of the transmission pad 14, the number of windings of the first coil unit 210 can be 17 turns. When the first coil unit 210 is not disposed on the transmission coil 15 of the transmission pad 14, the number of windings of the first coil unit 210 can be 14 turns. For the viewpoint of the foreign object detection apparatus 200, the transmission coil 15 functions as one noise generation source. An object sensing rate can be raised by increasing the number of windings of the first coil unit 210 on the transmission coil 125 having a high probability of noise generation.

In addition, the number of windings of the second coil unit 212 can be determined by the location of the second coil unit 212 on the transmission pad 14. The number of windings of the second coil unit 210 can be smaller when the second coil unit 212 is disposed on the transmission coil 15 of the transmission pad 14 than when the second coil unit 212 is not disposed on the transmission coil 15.

When the second coil unit 212 is disposed on the transmission coil 15 of the transmission pad 14, the number of windings of the second coil unit 212 can be one turn. When the second coil unit 212 is not disposed on the transmission coil 15 of the transmission pad 14, the number of windings of the second coil unit 212 can be two turns.

An induced voltage is formed by a magnetic field generated by the transmission coil 15. More magnetic fields are generated from the inner side of the transmission coil 15 than from the upper side of the transmission coil 15. The induced voltage can be more efficiently offset by raising the number of windings when the second coil unit 212 is not disposed on the transmission coil 15 than when the second coil unit 212 is disposed on the transmission coil 15.

Next, FIG. 10 is a diagram illustrating a plurality of object sensing devices according to an embodiment of the present invention. Referring to FIG. 10, the plural object sensing devices 201 may have an arrangement pattern covering the transmission pad 14. The arrangement pattern of the plural object sensing devices 201 can be determined based on the shape of the transmission pad 14. For example, the arrangement pattern of the plural object sensing devices 201 when the transmission pad 14 has a quadrangular shape and the arrangement pattern of the plural object sensing devices 201 when the transmission pad 14 has a hexagonal shape may differ.

Each of the plural object sensing devices 201 may include a first object sensing device 201a and a second object sensing device 201b. The object sensing device 201 in which the first coil unit 210 is deposited on the second coil unit 212 and the object sensing device 201 in which the second coil unit 212 is deposited on the first coil unit 210 can be alternately disposed.

The first object sensing device 201a and the second object sensing device 201b can be disposed in a line. For example, the first object sensing device 201a can be alternately disposed with the second object sensing device 201b, and the second object sensing device 201b can be alternately disposed with the first object sensing device 201a.

Further, the first object sensing device 201a can be disposed such that the first coil unit 210a is deposited on the second coil unit 212a. The second object sensing device 201b can also be disposed such that the second coil unit 212b is deposited on the first coil unit 210a. Due to the above arrangement pattern, a dead zone is minimized and thus an object sensing rate is raised.

Figure 11:
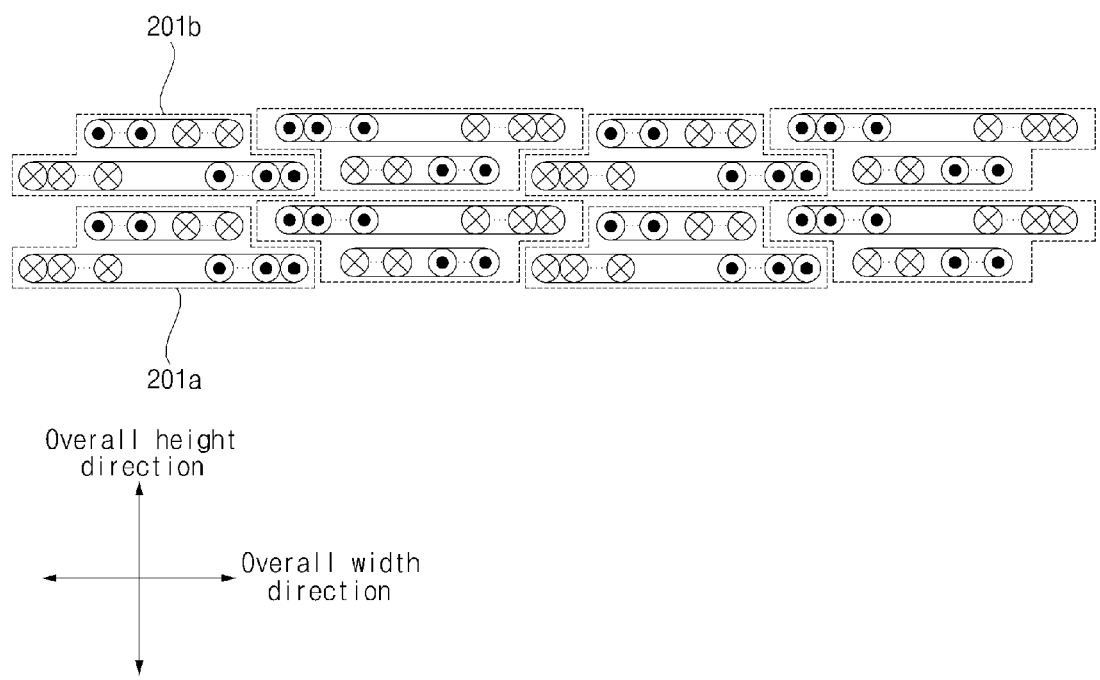
FIG. 11 is a diagram illustrating a plurality of object sensing devices according to an embodiment of the present invention.

FIG. 11 is a diagram illustrating a plurality of object sensing devices according to another embodiment of the present invention. Referring to FIG. 11, each of the plural object sensing devices 201 may include a first object sensing device 201a and a second object sensing device 201b. The first object sensing device 201a and the second object sensing device 201b can be deposited on each other. In this way, since the plural object sensing devices are deposited on each other, a dead zone is minimized and thus an object sensing rate is raised.

In addition, the detection circuit 270 can perform a control operation such that the first object sensing device 201a and the second object sensing device 201b are alternately operated on a time division basis. If the first object sensing device 201a and the second object sensing device 201b are simultaneously operated, they may function as noise. If the first object sensing device 201a and the second object sensing device 201b are alternately operated on a time division basis, occurrence of noise can be minimized.

Figure 12:
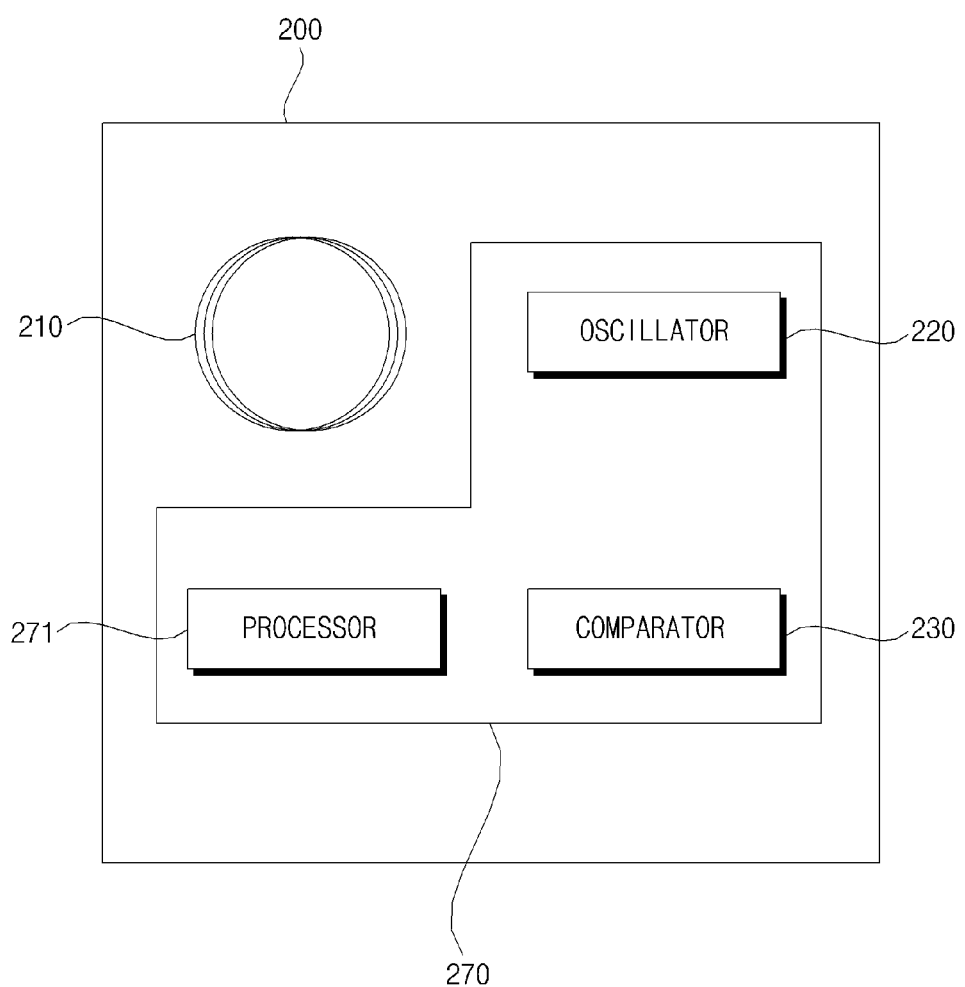
FIG. 12 is a diagram illustrating a foreign object detection apparatus according to an embodiment of the present invention.

FIG. 12 is a diagram illustrating a foreign object detection apparatus according to an embodiment of the present invention. Referring to FIG. 12, the detection circuit 270 can be electrically connected to the first coil unit 210.

As described above, there is a plurality of first coil units 210. The detection circuit 270 may include an oscillator 220, a comparator 230, and a processor 271. The oscillator 220, the comparator 230, and the processor 271 can be electrically connected. The foreign object detection apparatus 200 may further include a power supply.

In addition, the first coil unit 210 has a specific impedance. Thus, if a metallic foreign object is located in the vicinity of the first coil unit 210, a variation in impedance of the first coil unit 210 is observed from an external viewpoint.

Further, the oscillator 220 can generate an AC signal. For example, the oscillator 220 may include an oscillating circuit including a bipolar junction transistor (BJT) or an operational amplifier (OP Amp). For example, the oscillator 220 can be a Colpitts oscillator. The comparator 230 can compare a first element for defining a reference signal of the oscillator 220 with a second element for defining an actual output signal of the oscillator 220.

The reference signal can be defined as an output signal of the oscillator 220 when a set circuit configuration such as the first coil unit 210 is not changed. For example, the reference signal is a signal of an output terminal based on a unique impedance of a circuit including the first coil unit 210 when a metallic foreign object is not present in the vicinity of the first coil unit 210.

If a metallic foreign object is present in the vicinity of the first coil unit 210, the impedance of the first coil unit 210 is varied. In this instance, there is a difference between the reference signal and the actual output signal. When a metallic foreign object is present in the vicinity of the first coil unit 210, an effect of varying the impedance of the first coil unit 210 is produced from the viewpoint of the power supply so that there is a difference between a peak value of the reference signal and a peak value of the actual output signal.

When a metallic foreign object is present in the vicinity of the first coil unit 210, an effect of varying the impedance of the first coil unit 210 is produced from the viewpoint of a power supply side so that there is difference between a frequency of the reference signal and a frequency of the actual output signal. The difference between the reference signal and the output signal will be described in more detail with reference to FIGS. 15 and 16.

In addition, the comparator 230 can generate a first signal when the difference between the first element and the second element occurs. For example, the comparator 230 can generate a high signal, which is a DC signal, when the difference between the first element and the second element occurs. In some embodiments, the comparator 230 can generate a low signal, which is a DC signal, when the difference between the first element and the second element occurs.

The comparator 230 can generate a second signal when the difference between the first element and the second element does not occur. For example, the comparator 230 can generate a low signal, which is a DC signal, when the difference between the first element and the second element does not occur. In some embodiments, the comparator 230 can generate a high signal, which is a DC signal, when the difference between the first element and the second element does not occur.

In some embodiments, the foreign object detection apparatus 200 may further include a peak detector for detecting a peak value of an output signal. The comparator 230 can compare the peak value of the reference signal and the peak value of the output signal and then generate the first signal and the second signal.

For example, the comparator 230 generates the first signal when the peak value of the reference signal is different from the peak value of the output signal. In addition, the comparator 230 generates the second signal when there is no difference in a peak value between the reference signal and the output signal. In some embodiments, the foreign object detection apparatus 200 may further include a frequency detector for detecting a frequency of the output signal.

The comparator 230 can compare the frequency of the reference signal with the frequency of the output signal and generate the first signal and the second signal. For example, the comparator 230 can generate the first signal when the frequency of the reference signal is different from the frequency of the output signal. Also, the comparator 230 generates the second signal when there is no difference in frequency between the reference signal and the output signal.

The processor 271 can be electrically connected to and control each constituent element of the foreign object detection apparatus 200. In addition, the processor 271 can determine whether a foreign object is present between the transmission pad 14 and the reception pad 21, based on the first signal and the second signal. Upon determining that a foreign object is present between the transmission pad 14 and the reception pad 21, the processor 271 can generate an alarm signal.

In some embodiments, the foreign object detection apparatus 200 may include an additional alarm unit. Thus, the processor 271 can perform a control operation such that an alarm can be output from the alarm unit. The processor 271 can also provide a control signal to a user interface device so that the alarm can be output through the user interface device.

Further, the processor 271 can provide a signal for stopping wireless charging to the wireless charging system 100. In some embodiments, the processor 270 can serve as the comparator 230. Specifically, the processor 271 can compare the first element for defining the reference signal of the oscillator 220 with the second element for defining the actual output signal of the oscillator 220.

When there is a difference between the first element and the second element, the processor 271 can determine that a foreign object is present between the transmission pad 14 and the reception pad 21. When there is no difference between the first element and the second element, the processor 271 can determine that a foreign object is not present between the transmission pad 14 and the reception pad 21. The foreign object detection apparatus 200 may further include a memory for storing the first element for defining the reference signal.

Figure 13:
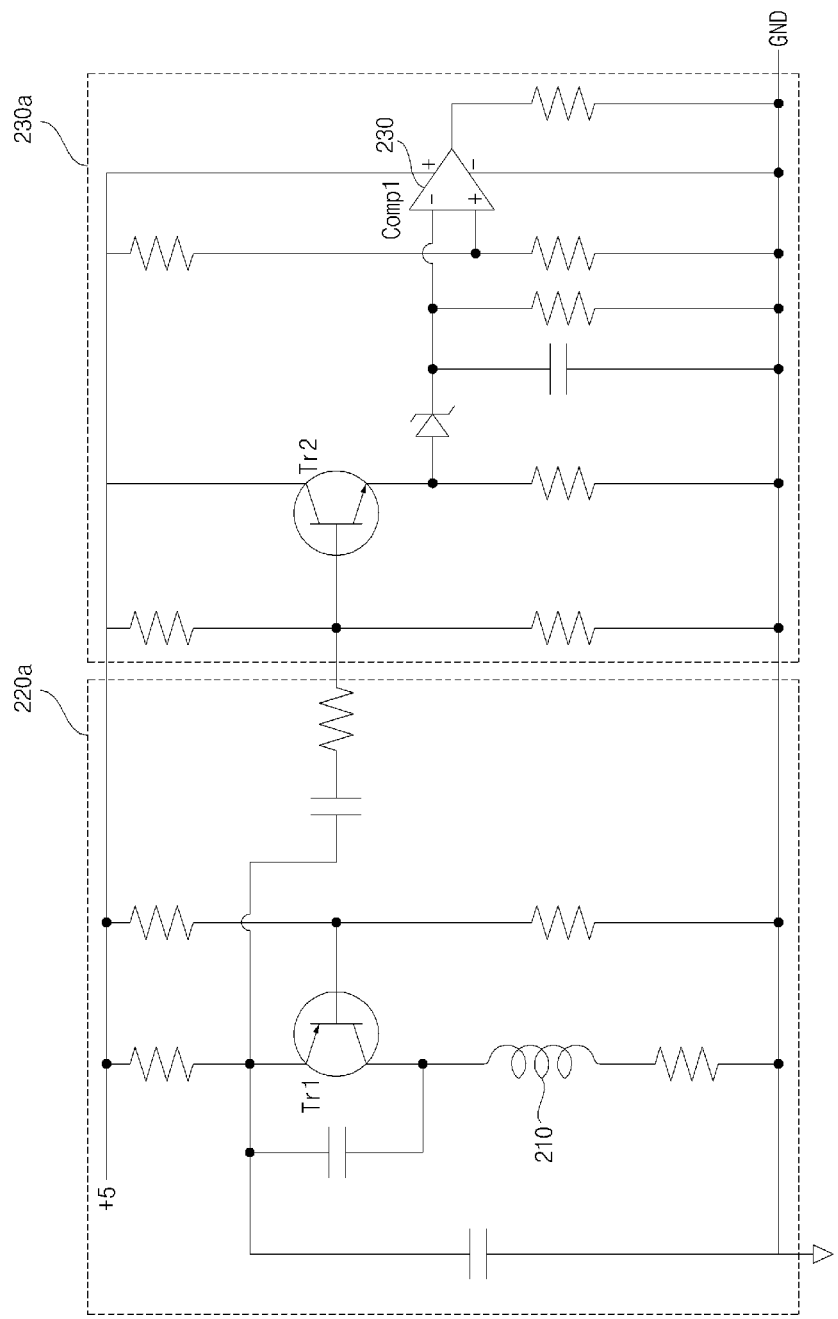
FIG. 13 is a diagram illustrating configurations of an oscillator circuit and a comparison circuit according to an embodiment of the present invention.

Next, FIG. 13 is a diagram illustrating configurations of an oscillator circuit and a comparison circuit according to an embodiment of the present invention. Referring to FIG. 13, an oscillator 220 may be a Colpitts oscillator 220a. In some embodiments, the oscillator 220 may include an oscillating circuit including a BJT or an OP Amp.

If a metallic foreign object approaches the first coil unit 210, an equivalent impedance of the first coil unit 210 is changed. In addition, a second transistor Tr2 included in a comparison circuit 230a amplifies the magnitude of an oscillating signal of a first transistor Tr1 included in the oscillator 220. The comparator 230 compares an output voltage of an emitter of the second transistor Tr2 with a reference voltage of a + terminal of the comparator 230 and generate a first signal or a second signal.

Figure 14:
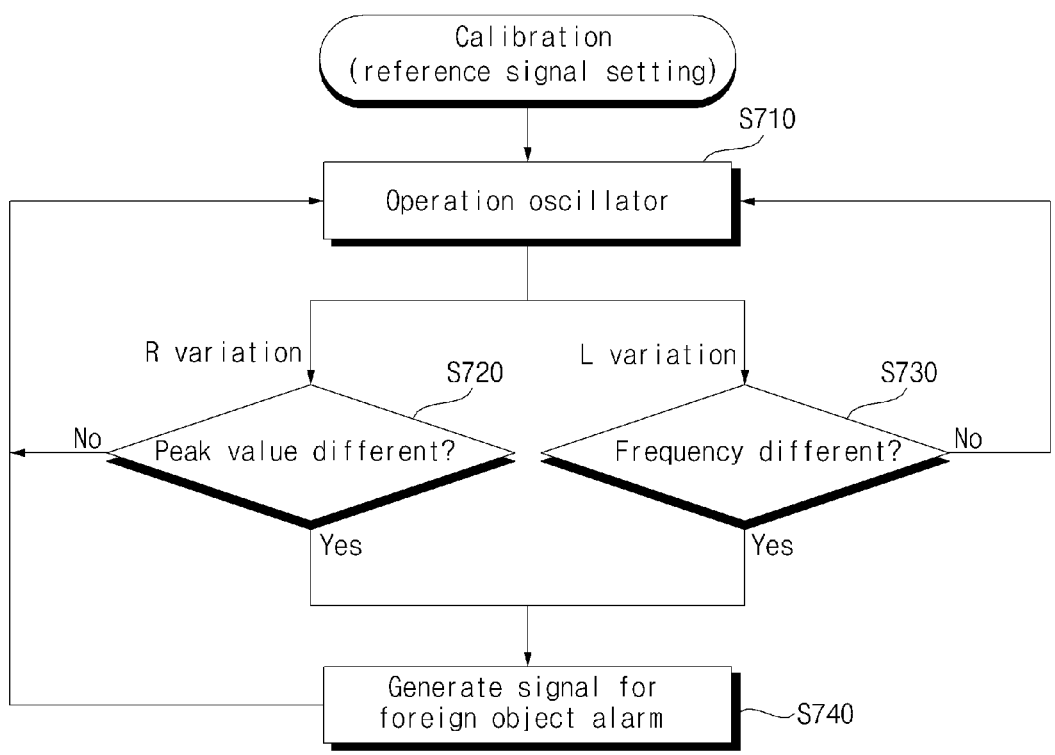
FIG. 14 is a flowchart illustrating an operation of a foreign object detection apparatus according to an embodiment of the present invention.

Next, FIG. 14 is a flowchart illustrating an operation of a foreign object detection apparatus according to an embodiment of the present invention. Referring to FIG. 14, the processor 271 can perform calibration for a reference signal and perform a control operation to drive the oscillator 220 (S710).

The comparator 230 can compare the first element for defining a reference signal of the oscillator 220 with the second element for defining an actual output signal of the oscillator 220. For example, the foreign object detection apparatus 200 may further include a peak detector. In this instance, the comparator 230 can compare a peak value of the reference signal of the oscillator 220 with a peak value of the output signal detected by the peak detector (S720).

If a resistance component among impedance components of the first coil unit 210 varies, the peak value of the output signal may vary. For example, the foreign object detection apparatus 200 may further include a frequency detector. In this instance, the comparator 230 can compare a frequency of the reference signal of the oscillator 220 with a frequency of the output signal detected by the frequency detector (S730).

If an inductance component among impedance components of the first coil unit 210 varies, the frequency of the output signal may vary. Upon determining, in step S720, that there is a difference between the peak value of the reference signal and the peak value of the output signal, the processor 271 can generate a signal for alarm output (S740). Upon determining, in step S730, that there is a difference between the frequency of the reference signal and the frequency of the output signal, the processor 271 can generate a signal for alarm output (S740).

Figure 15:
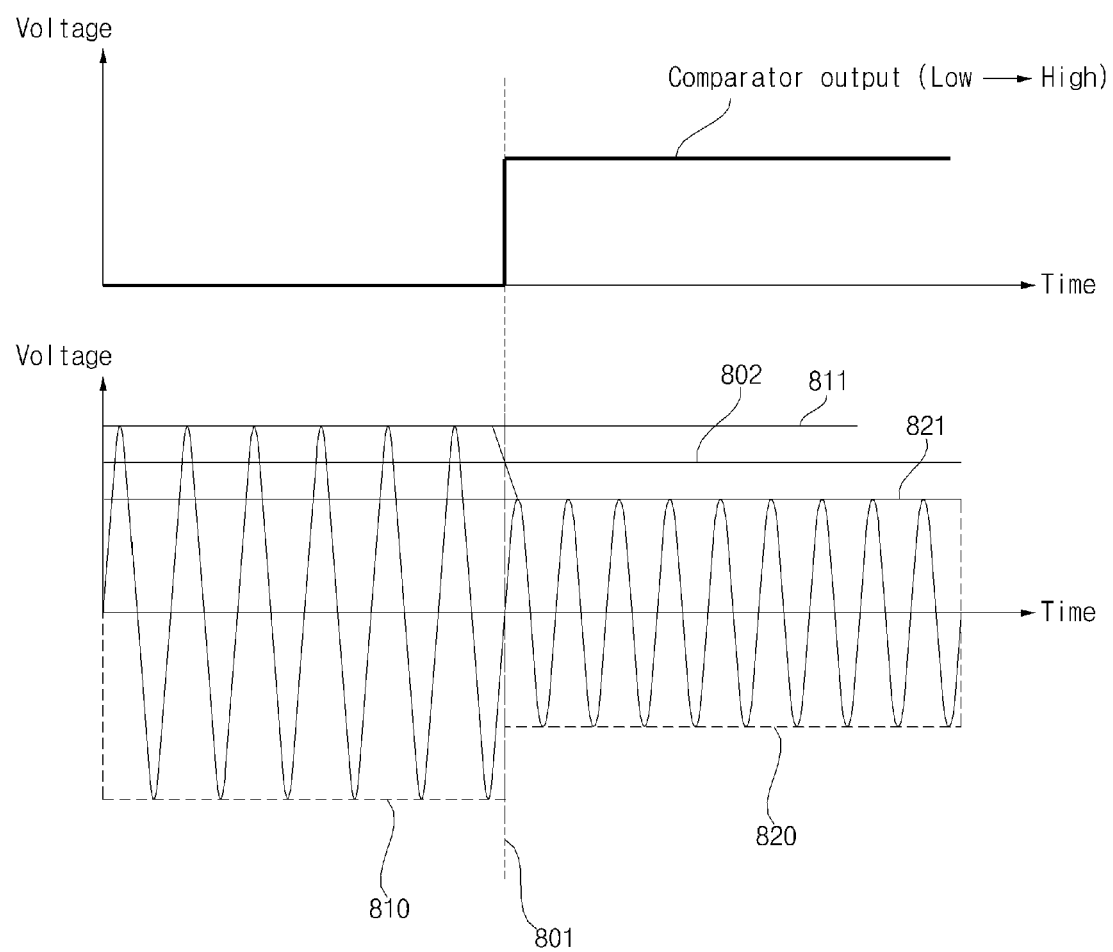
FIGS. 15 and 16 are diagrams illustrating a reference signal and an output signal according to an embodiment of the present invention.
Figure 16:
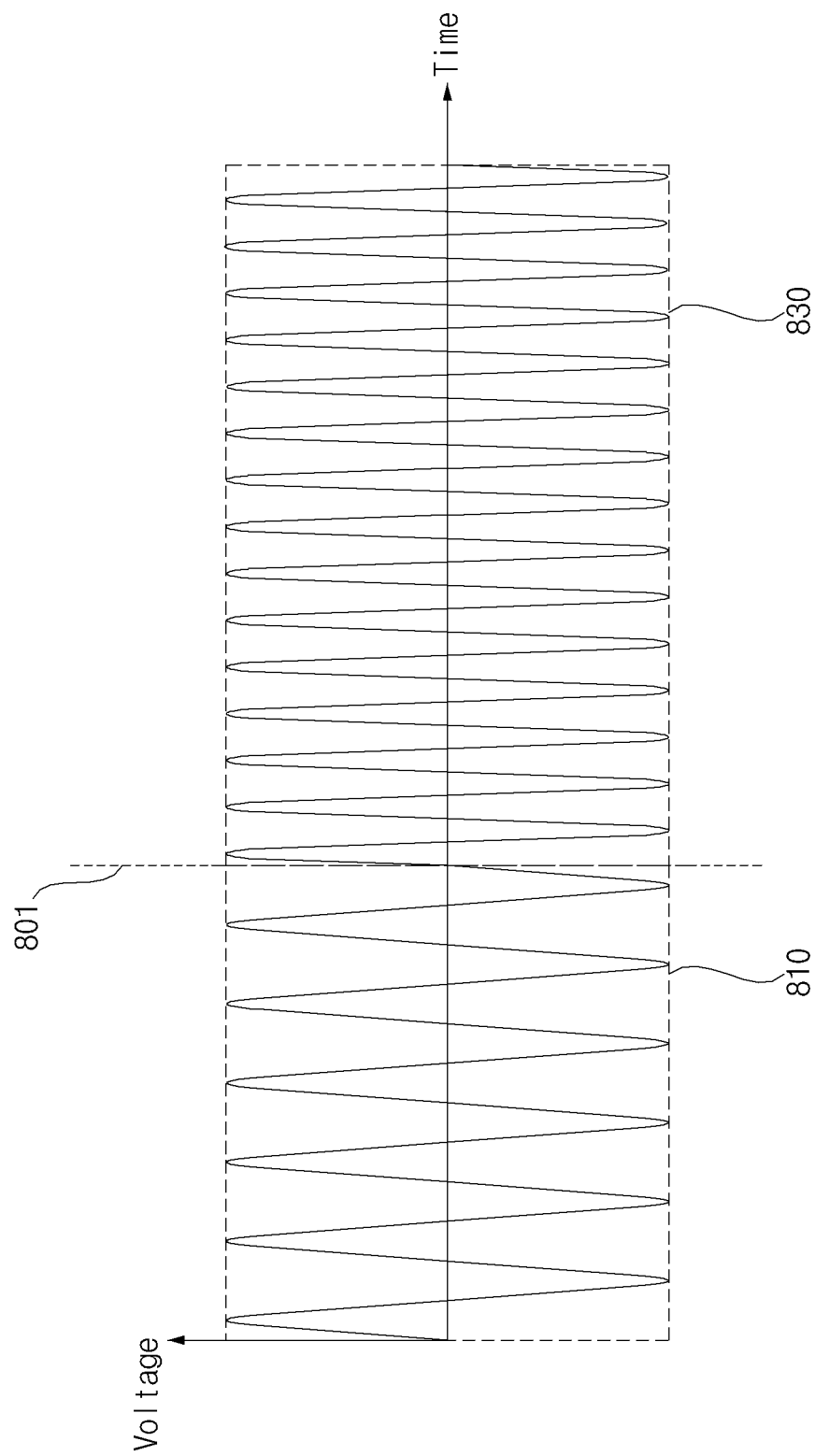

FIGS. 15 and 16 are diagrams illustrating a reference signal and an output signal according to an embodiment of the present invention. The comparator 230 can compare the first element for defining the reference signal of the oscillator 220 with the second element for defining the actual output signal of the oscillator 220. If a metallic foreign object is present in the vicinity of the first coil unit 210, an equivalent impedance of the first coil unit 210 varies by the metallic foreign object when the first coil unit 210 is observed from the oscillator 220.

Referring to FIG. 15, the magnitude of the output signal of the oscillator 220 is determined by an equivalent resistance of the first coil unit 210. If a resistance component among equivalent impedance components of the first coil unit 210 varies, the magnitude of the output signal of the oscillator 220 also varies.

Reference numeral 810 indicates an output signal when a metallic foreign object is not present in the vicinity of the first coil unit 210. Reference numeral 810 can be appreciated as the reference signal. Reference numeral 820 indicates an output signal when a metallic foreign object is present in the vicinity of the first coil unit 210.

When a metallic foreign object is not present in the vicinity of the first coil unit 210, if the metallic foreign object approaches the first coil unit 210 at a timing 801, the output signal is formed as indicated by reference numerals 810 and 820 of FIG. 15. The comparator 230 can compare a peak value 811 of the reference signal 810 with a peak value 821 of the output signal 820 and generate a first signal and a second signal.

When there is a difference between the peak value 811 of the reference signal 810 and the peak value 821 of the output signal 820, the comparator 230 can generate a high signal as the first signal. When there is no difference between the peak value 811 of the reference signal 810 and the peak value 821 of the output signal 820, the comparator 230 can generate a low signal as the second signal. In addition, the comparator 230 can compare a reference value 802 set to a value smaller by a predetermined value than the peak value 811 of the reference signal 810 with the peak value 821 of the output signal 820 and generate the first signal and the second signal.

Referring to FIG. 16, a frequency of the output signal of the oscillator 220 is determined by an equivalent inductance of the first coil unit 210 and a value of a capacitor included in the oscillator 220. When an inductance component among equivalent impedance components of the first coil unit 210 varies, the frequency of the output signal of the oscillator 220 varies. Reference numeral 810 indicates an output signal when a metallic foreign object is not present in the vicinity of the first coil unit 210. Reference numeral 810 can be appreciated as the reference signal. Reference numeral 830 indicates an output signal when a metallic foreign object is present in the vicinity of the first coil unit 210.

When a metallic foreign object is not present in the vicinity of the first coil unit 210, if the metallic foreign object approaches the first coil unit 210 at a timing 801, the output signal is formed as indicated by reference numerals 810 and 830 of FIG. 16. The comparator 230 can compare the frequency of the reference signal 810 with the frequency of the output signal 830 and generate the first signal and the second signal.

When there is a difference between the frequency of the reference signal 810 and the frequency of the output signal 830, the comparator 230 can generate a high signal as the first signal. When there is no difference between the frequency of the reference signal 810 and the frequency of the output signal 830, the comparator 230 can generate a low signal as the second signal.

Figure 17:
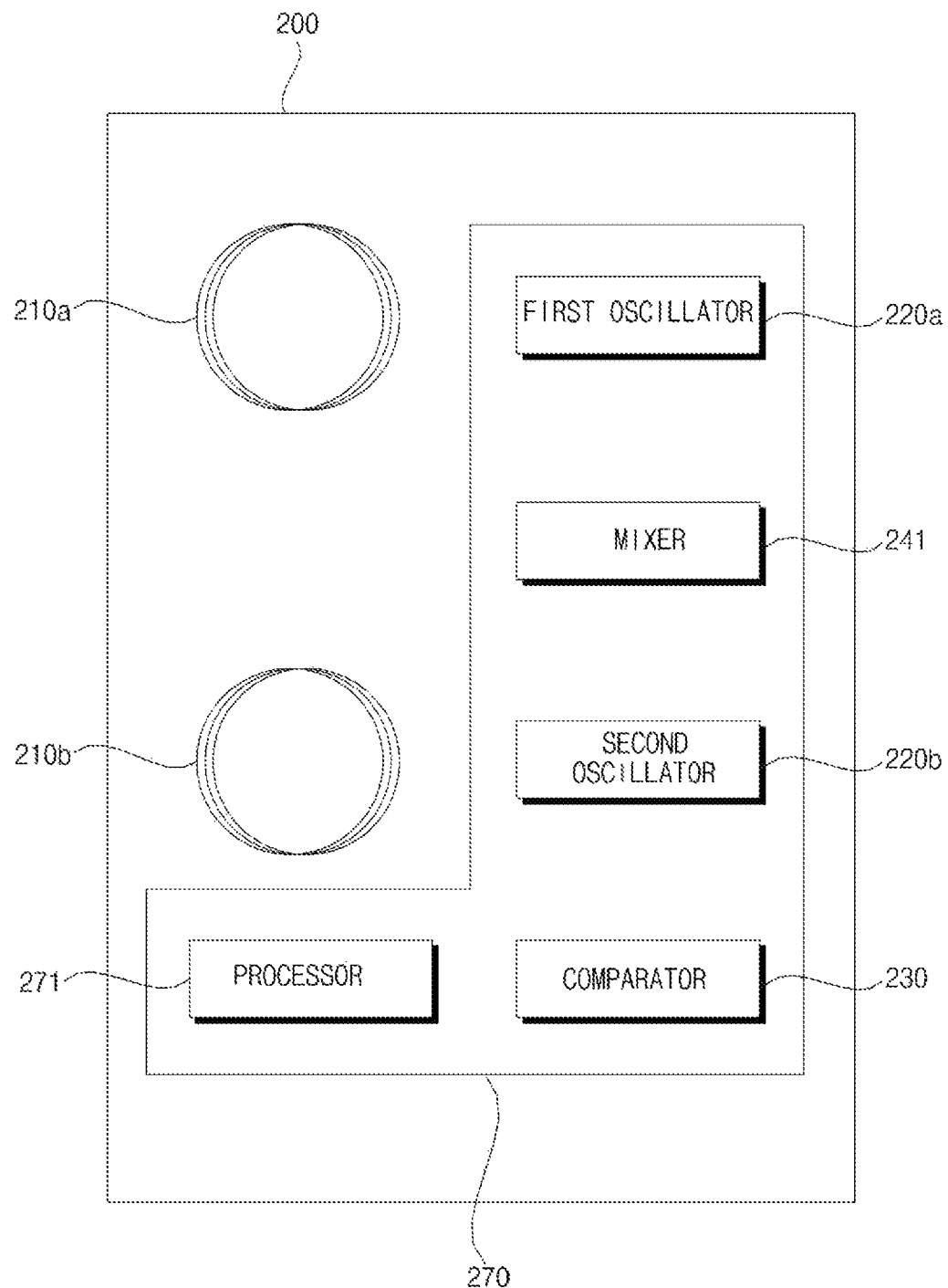
FIG. 17 is a diagram illustrating a foreign object detection apparatus according to an embodiment of the present invention.

FIG. 17 is a diagram illustrating a foreign object detection apparatus according to an embodiment of the present invention. Referring to FIG. 17, the detection circuit 270 can be electrically connected to a plurality of first coil units 210a and 210b. A description of the first coil unit 210 given with reference to FIGS. 1 to 16 can be applied to a description of the first coil units 210a and 210b. A description of the oscillator 220 given with reference to FIG. 1 to FIG. 16 can also be applied to a description of a first oscillator 220a and a second oscillator 220b.

Hereinafter, a description will be given focusing on differences from the description given with reference to FIGS. 1 to 16. The first oscillator 220a can generate a first AC signal. The second oscillator 220b can also generate the first AC signal.

In more detail, the first oscillator 220a and the second oscillator 220b can generate AC signals defined by an equal element. Any one 210a of the plural first coil units can be electrically connected to the first oscillator 220a, and the other one 210b of the plural first coil units can be electrically connected to the second oscillator 220a.

In addition, the comparator 230 can compare a first element for defining a first output signal caused by the first oscillator 220a with a second element for defining a second output signal caused by the second oscillator 220b. If a metallic foreign object is present in the vicinity of any one 210a of the plural first coil units, there is a difference between the first output signal and the second output signal due to variation in equivalent impedance of any one 210a of the plural first coil units. Whether a foreign object is present can be determined by this difference.

The comparator 230 can generate a comparison signal according to the result of comparison. The processor 271 can determine whether a foreign object is present between the transmission pad 14 and the reception pad 21 based on the comparison signal. In addition, a mixer 241 can mix the first output signal and the second output signal, and the processor 271 can determine whether a foreign object is present between the transmission pad 14 and the reception pad 21 based on an output signal of the mixer 241.

Figure 18:
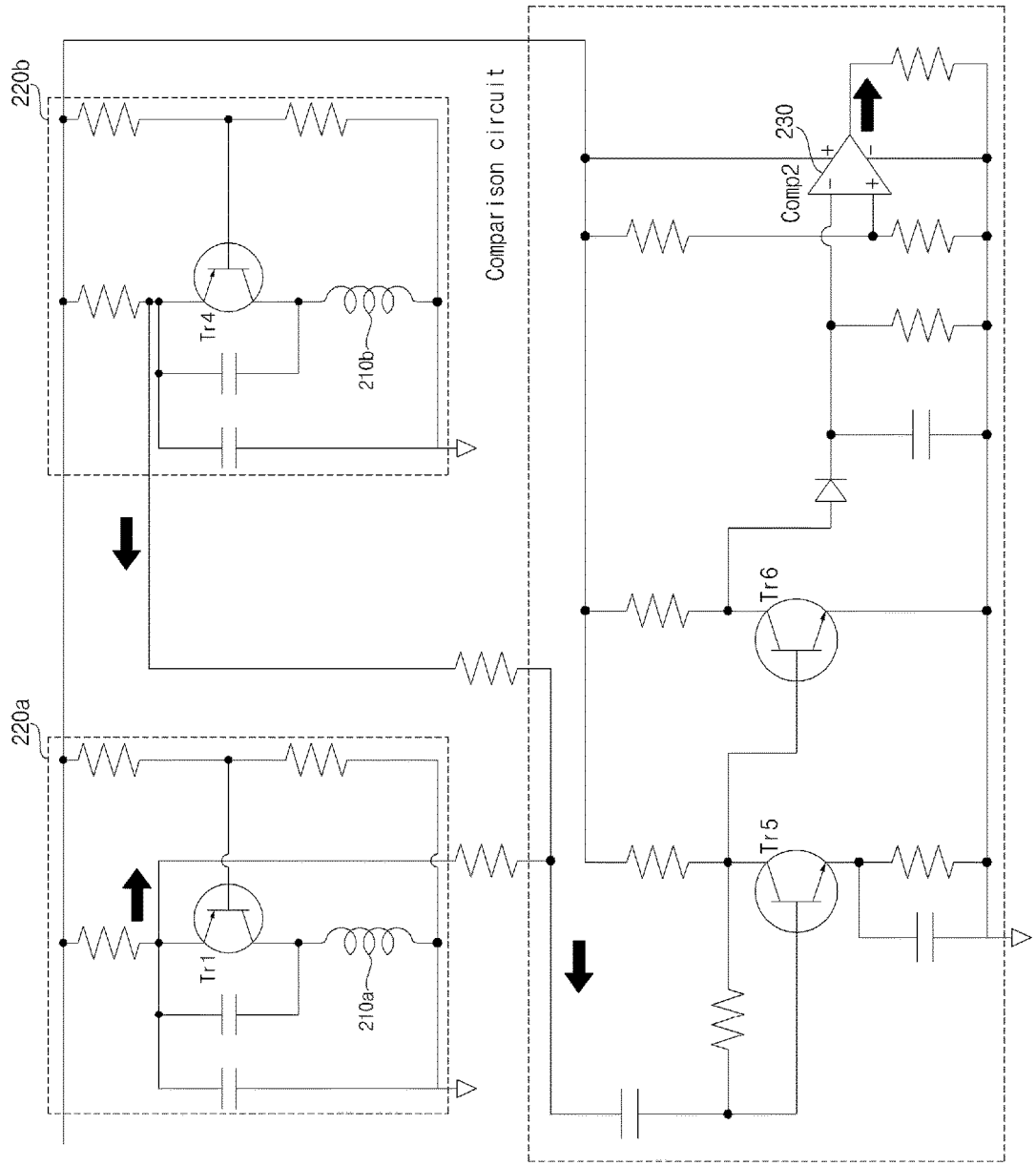
FIG. 18 is a diagram illustrating configurations of an oscillator circuit and a comparison circuit according to an embodiment of the present invention.

Next, FIG. 18 is a diagram illustrating configurations of an oscillator circuit and a comparison circuit according to an embodiment of the present invention. Referring to FIG. 18, the first oscillator 220a and the second oscillator 220b may be Colpitts oscillators. In some embodiments, each of the first oscillator 220a and the second oscillator 220b can include an oscillating circuit including a BJT or an OP Amp.

The first and second oscillators 220a and 220b can generate the same AC signal. If a metallic foreign object approaches any one 210a of the plural first coil units, an equivalent impedance of any one 210a of the plural first coil units varies. In this instance, the first output signal caused by the first oscillator 220a and the second output signal caused by the second oscillator 220b are not identical.

If a metallic foreign object approaches the other one 210b of the plural first coil units, an equivalent impedance of the other one 210b of the first coil units varies. In this instance, the first output signal caused by the first oscillator 220a and the second output signal caused by the second oscillator 220b are not identical. If the metallic foreign object is present in the vicinity of any one of the plural first coil units 210a and 210b, the first output signal and the second output signal are added and then the comparator 230b outputs a beating output waveform.

Figure 19:
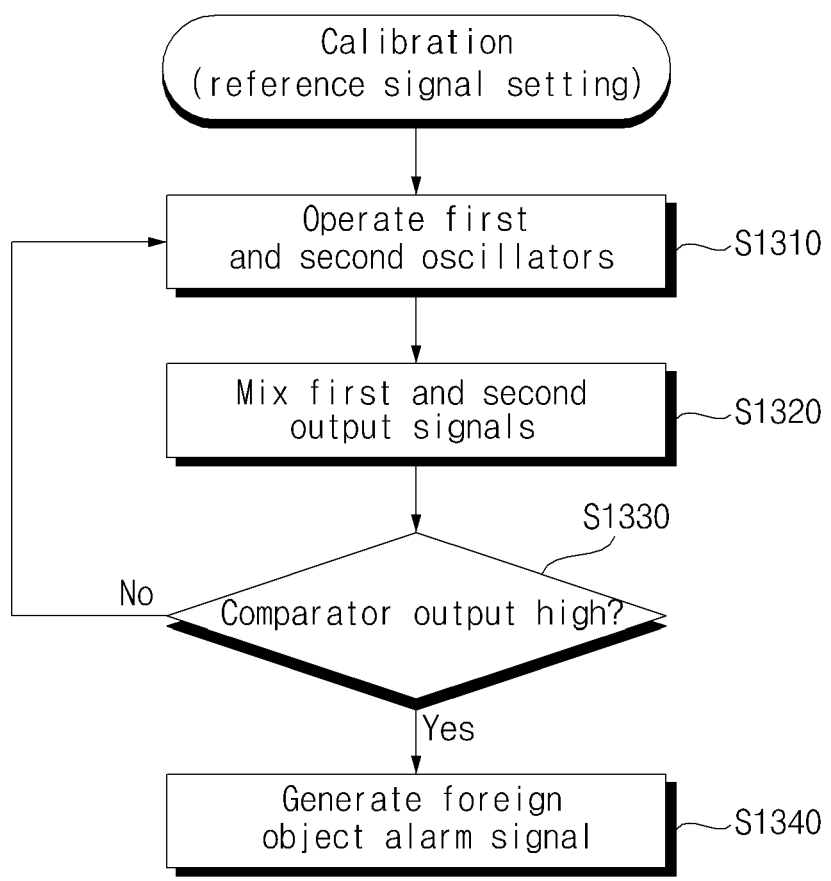
FIG. 19 is a flowchart illustrating an operation of a foreign object detection apparatus according to an embodiment of the present invention.

FIG. 19 is a flowchart illustrating an operation of a foreign object detection apparatus according to an embodiment of the present invention. Referring to FIG. 19, the processor 271 can perform calibration for a reference signal. The processor 271 can perform a control operation to drive the first and second oscillators 220a and 220b (S1310).

The mixer 241 can mix the first and second output signals (S1320). If an impedance component of any one of the plural first coil units 210a and 201b varies, the mixed output signal has a beat frequency. The comparator 230 can compare the reference signal with the mixed output signal and determine whether there is a difference therebetween (S1330).

The reference signal is a signal obtained by adding the respective reference signals of the first and second oscillators 220a and 220b. Upon determining that there is difference between the reference signal and the mixed signal, the processor 271 can generate a signal for outputting an alarm (S1340).

Figure 20:
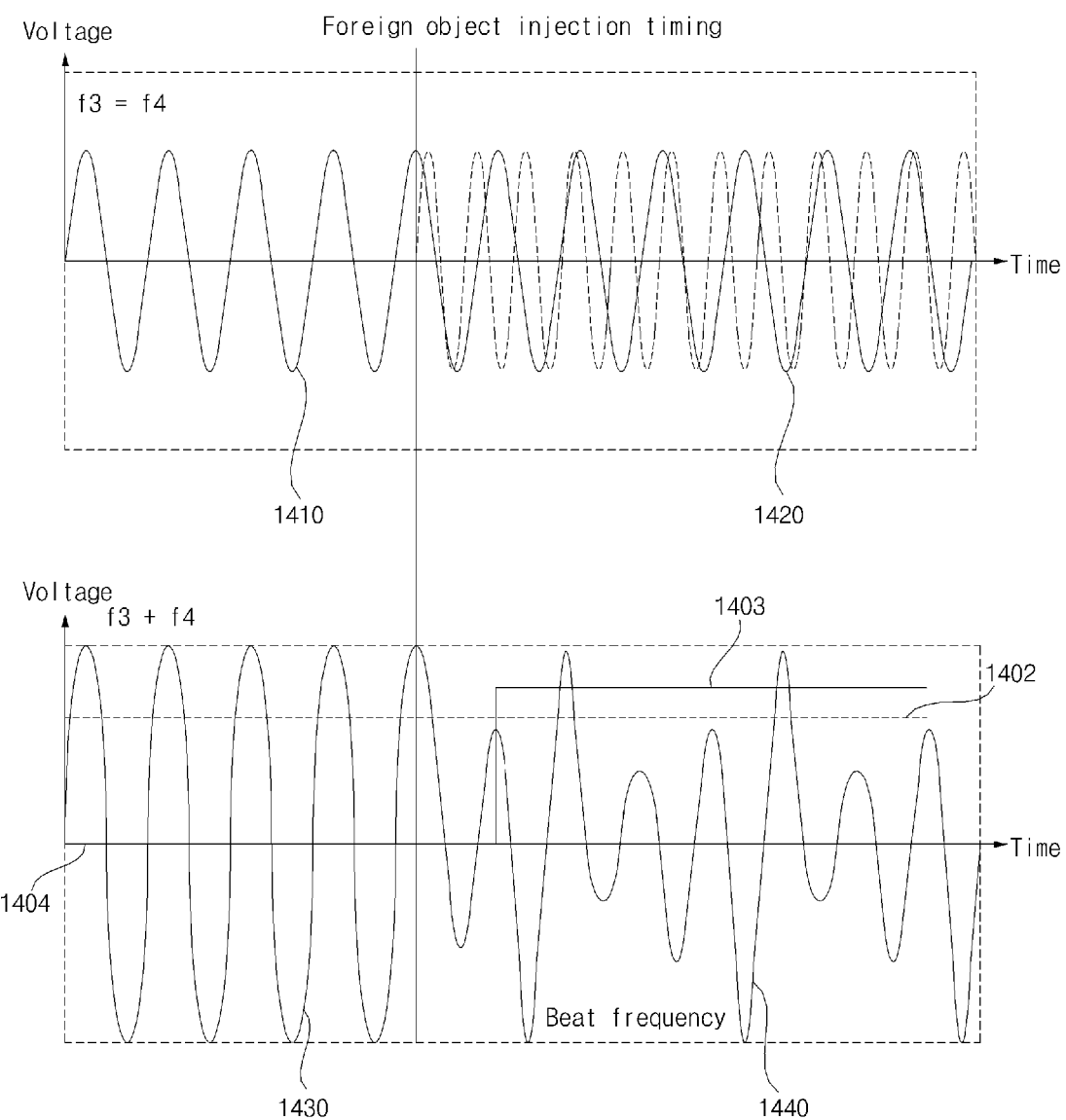
FIG. 20 is a diagram illustrating a first output signal, a second output signal, and a mixed signal, according to an embodiment of the present invention.

FIG. 20 is a diagram illustrating a first output signal, a second output signal, and a mixed signal, according to an embodiment of the present invention. Referring to FIG. 20, reference numeral 1410 indicates a first output frequency and a second output frequency when a metallic foreign object is not present in the vicinity of the plural first coil units 210a and 210b.

Reference numeral 1420 indicates the first output frequency and the second output frequency when a metallic foreign object is present in the vicinity of any one of the plural first coil units 210a and 210b. Reference numeral 1430 indicates a mixture of the first output frequency and the second output frequency when a metallic foreign object is not present in the vicinity of any one of the plural first coil units 210a and 210b. Reference numeral 1430 can be appreciated as a reference frequency.

Reference numeral 1440 indicates a mixture of the first output frequency and the second output frequency when a metallic foreign object is present in the vicinity of any one of the plural first coil units 210a and 210b. As illustrated by reference numeral 1440, when a metallic foreign object is present in the vicinity of any one of the plural first coil units 210a and 210b, a mixed frequency of the first output frequency and the second output frequency has a beat frequency. In this instance, the comparator 230 can compare the mixed frequency 1440 output from the mixer 241 with the reference frequency 1430 and generate a first signal (high signal) 1403 or a second signal (or low signal) 1404.

Figure 21:
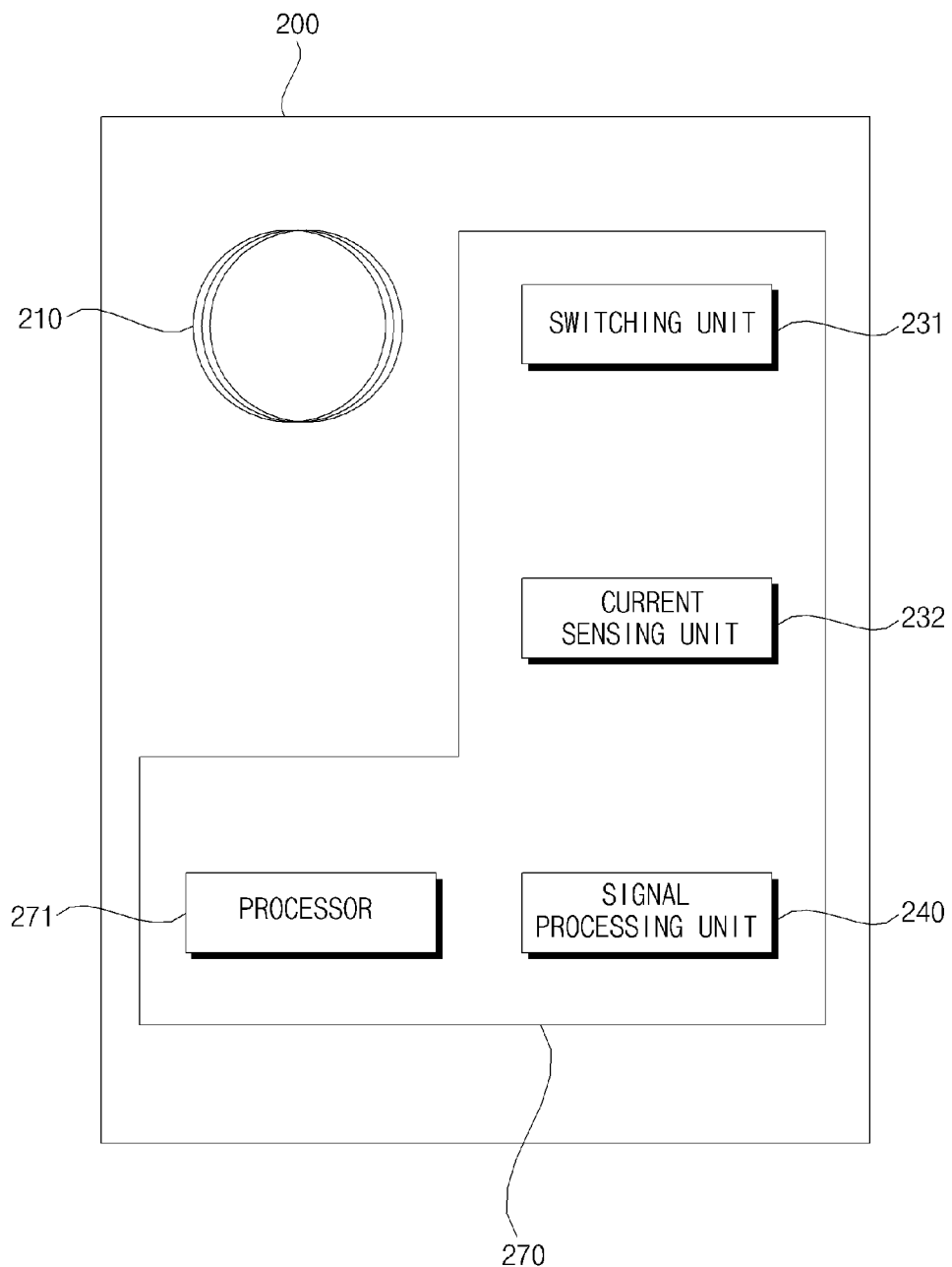
FIG. 21 is a diagram illustrating a foreign object detection apparatus according to an embodiment of the present invention.

FIG. 21 is a diagram illustrating a foreign object detection apparatus according to an embodiment of the present invention. Referring to FIG. 21, the detection circuit 270 can be electrically connected to the first coil unit 210. As described above, there is a plurality of first coil units 210. The detection circuit 270 may include a switching unit 231, a current sensing unit 232, a signal processing unit 240, and the processor 271.

The foreign object detection apparatus 200 may further include a power supply for supplying a DC power source. The first coil unit 210, the switching unit 231, the current sensing unit 232, the signal processing unit 240, and the processor 271 can be electrically connected.

In addition, the first coil unit 210 has a specific impedance. If a metallic foreign object is present near the first coil unit 210, variation in impedance of the first coil unit 210 occurs from the external viewpoint. The switching unit 231 can be disposed between the DC power source and the first coil unit 210.

The switching unit 231 can switch a connection between the DC power source and the first coil unit 210. The foreign object detection apparatus 200 may further include a freewheeling diode, which can be connected to the first coil unit 210 in parallel. The switching unit 231 may include a metal oxide semiconductor field effect transistor (MOSFET), which is controlled based on a pulse width modulation (PWM) signal. The switching unit 231 may correspond in number to the first coil unit 210. For example, the switching unit 231 may include a first switch and a second switch.

The first switch can be disposed between the DC power source and any one of the plural first coil unit, and the second switch can be disposed between the DC power source and the other one of the plural first coil units. A plurality of switches included in the switching unit 231 can be synchronized to be simultaneously turned on or simultaneously turned off.

Further, the current sensing unit 232 can sense variation in current flowing into the first coil unit 210 according to turning-on or turning-off of the switching unit 231. The current sensing unit 232 may include a sensing resistor. In this instance, the sensing resistor can be connected to the first coil unit 210 in series. The current sensing unit 232 may include a Hall element.

In addition, the current sensing unit 232 may correspond in number to the first coil units 210. For example, the current sensing unit 232 may include a first sensor and a second sensor. Also, the first sensor can sense a value of current flowing into any one 210a of the plural first coil units, and the second sensor can sense a value of current flowing into the other one of the plural first coil units.

The signal processing unit 240 can process a first signal generated from the current sensing unit 232 and generate a second signal. As connection and disconnection of the first coil unit 210 to and from the DC power source according to switching are repeated, the first signal can be explained as variation in current flowing into the first coil unit 210.

The first signal may have an RL transient response type, and the second signal can be defined as an integral value of the first signal during a preset time. The second signal can be defined as a peak value of the first signal. The second signal can be defined as an average value of the first signal. The signal processing unit 240 may include a comparator.

In addition, the signal processing unit can include an analog circuit, a digital circuit using a microprocessor, or a combination of the analog circuit and the digital circuit. The comparator can also compare the first signal with a reference signal. For example, the comparator can generate a third signal when there is a difference between the first signal and the reference signal.

Also, the comparator can generate a fourth signal when there is no difference between the first signal and the reference signal. For example, the comparator can generate the third signal when the first signal is above the reference value, and generate the fourth signal when the first signal is less than the reference value. The comparator can also generate the third signal when the first signal is less than the reference value.

Further, the comparator can generate the fourth signal when the first signal is greater than the reference value. The third signal can be a high signal, which is a DC signal, and the fourth signal can be a low signal, which is a DC signal. The third signal can be a low signal, which is a DC signal, and the fourth signal can be a high signal, which is a DC signal.

In addition, the signal processing unit 240 may correspond in number to the first coil units 210. For example, the signal processing unit 240 may include a first signal processing unit and a second signal processing unit. The first signal processing unit can process a signal generated from the first sensor. The second signal processing unit can process a signal generated from the second sensor. The processor 271 can be electrically connected to each constituent element of the foreign object detection apparatus 200.

The processor 271 can control each constituent element of the foreign object detection apparatus, and determine whether a foreign object is present between the transmission pad 14 and the reception pad 21 based on the second signal processed by the signal processing unit 240. The processor 271 can also generate a signal for alarm output upon determining that a foreign object is present between the transmission pad 14 and the reception pad 21.

In some embodiments, the foreign object detection apparatus 200 may include an additional alarm unit. Further, the processor 271 can control the alarm unit to output an alarm. The processor 271 can also provide a control signal to a user interface device so that an alarm can be output through the user interface device. The processor 271 may provide a signal for stopping wireless charging to the wireless charging system 100.

In some embodiments, the processor 271 can serve as the signal processing unit 240 and can determine that a foreign object is present between the transmission pad 14 and the reception pad 21 upon receiving the third signal from the comparator. In addition, the foreign object detection apparatus 200 may further include a memory. The memory can store a reference value which will be described later. In some embodiments, the memory can be classified as a lower constituent of the processor 271.

Figure 22:
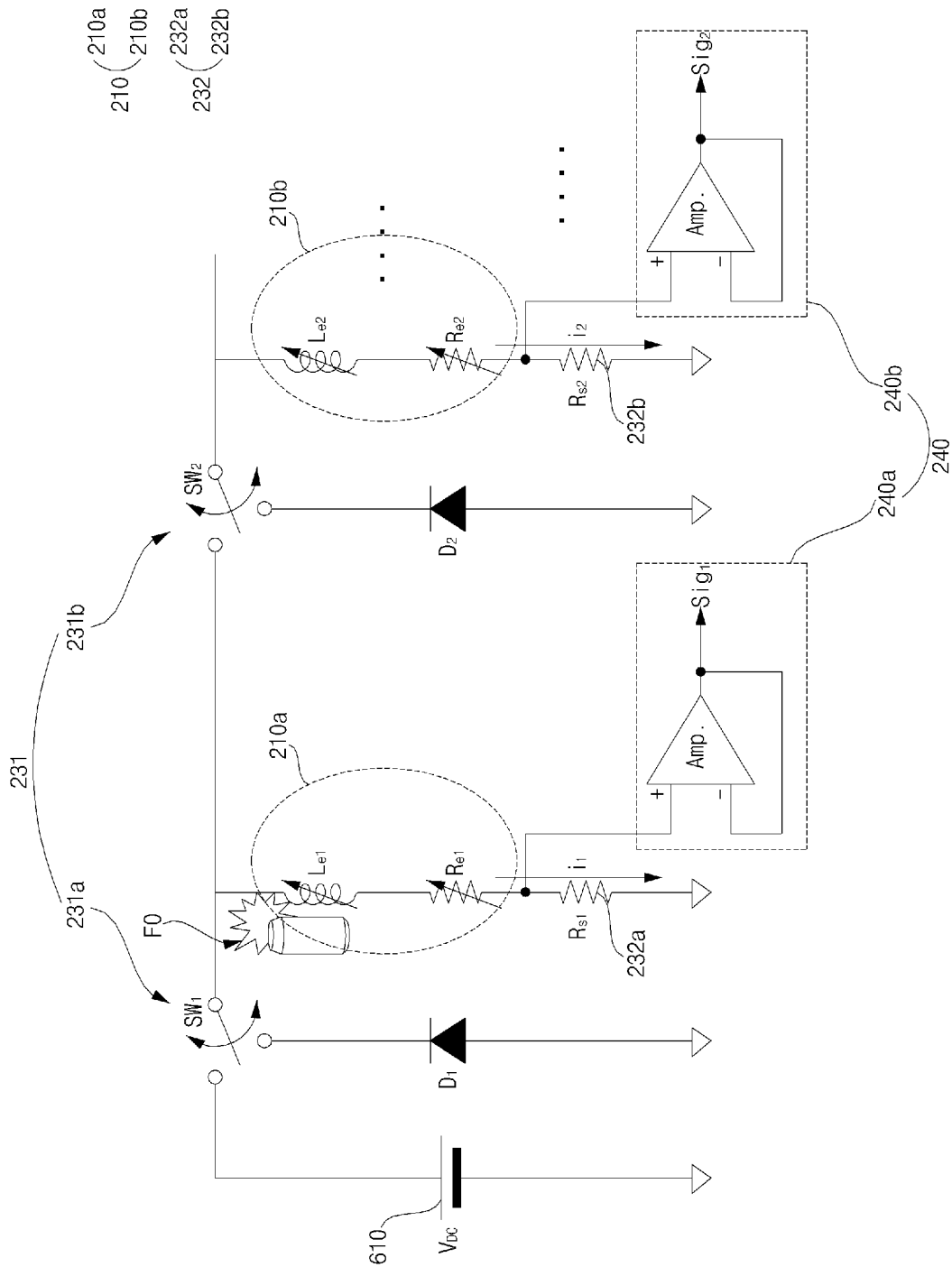
FIG. 22 is a diagram illustrating a foreign object detection apparatus according to an embodiment of the present invention.

Next, FIG. 22 is a diagram illustrating a foreign object detection apparatus according to an embodiment of the present invention. Referring to FIG. 22, the first coil unit 210 may include a plurality of first coil units 210a and 210b. Any one 210a of the plural first coil units can be connected to the other one 210b of the plural first coil units in parallel.

In a general situation, any one 210a of the plural first coil units is equal in impedance to the other one 210b of the plural first coil units. The first coil unit 210 can be represented by an inductor and a resistor. If a metallic foreign object FO is present in the vicinity of the first coil unit 210, a variation in impedance of the first coil unit 210 occurs from the external viewpoint.

When the metallic foreign object FO is present near any one 210a of the plural first coil units, the impedance of any one 210a of the plural first coil units varies. For example, the impedance of any one 210a of the plural first coil units may vary due to the metallic foreign object FO which is present in the vicinity of any one 210a of the plural first coil units.

Also, a resistance component of the one 210a of the plural first coil units may vary due to the metallic foreign object FO which is present in the vicinity of any one 210a of the plural first coil units. The switching unit 231 can be disposed between a DC power source 610 and the first coil unit 210 and may include a first switch 231a and a second switch 231b.

The first switch 231a can be disposed between the DC power source 610 and the one 210a of the plural first coil units. Also, the second switch 231b can be disposed between the DC power source 610 and the other one 210b of the plural first coil units. In some embodiments, the foreign object detection apparatus 200 may further include freewheeling diodes D1 and D2.

In particular, the freewheeling diodes D1 and D2 may correspond in number to the first coil unit 210. The first freewheeling diode D1 can be connected to any one 210a of the plural first coil units in parallel. The first switch 231a connects any one 210a of the plural first coil unit to the DC power source 610 in a turned-on state of the first switch 231a.

In addition, the first switch 231a connects any one 210a of the plural first coil unit to the first freewheeling diode D1 in a turned-on state of the first switch 231a. The second freewheeling diode D2 can be connected to the other one 210b of the plural first coil units in parallel. The second switch 231b connects the other one 210b of the plural first coil unit to the DC power source 610 in a turned-on state of the second switch 231b.

The second switch 231b connects the other one 210b of the plural first coil units to the second freewheeling diode D2 in a turned-off state of the second switch 231b. The current sensing unit 232 can be connected to the first coil unit 210 in series. When the current sensing unit 232 is comprised of a current sensing resistor, a voltage of both ends of the current sensing resistor can be input to the signal processing unit 240.

Further, the current sensing unit 232 may include a first sensor 232a and a second sensor 232b. The first sensor 232a can sense a value of current flowing into any one 210a of the plural first coil units. Also, the first sensor 232a can be connected to any one 210a of the plural first coil units in series. The second sensor 232b can sense a value of current flowing into the other one 210b of the plural first coil units.

In addition, the second sensor 232b can be connected to the other one 210b of the plural first coil units in series. The signal processing unit 240 can be connected to a node between the first coil unit 210 and the current sensing unit 232. The signal processing unit 240 may include a first signal processing unit 240a and a second signal processing unit 240b.

The first signal processing unit 240a can process a signal generated from the first sensor 232a. The first signal processing unit 240a can be connected to a node formed between any one 210a of the plural first coil units and the first sensor 232a. The second signal processing unit 240b can process a signal generated from the second sensor 232b.

The second signal processing unit 240b can be connected to a node formed between the other one 210b of the plural first coil units and the second sensor 232b. In some embodiments, the processor 271 can compare the signal generated from the first sensor 232a with the signal generated from the second sensor 232b and determine whether a foreign object is present by determining whether there is difference between the two signals.

Figure 23:
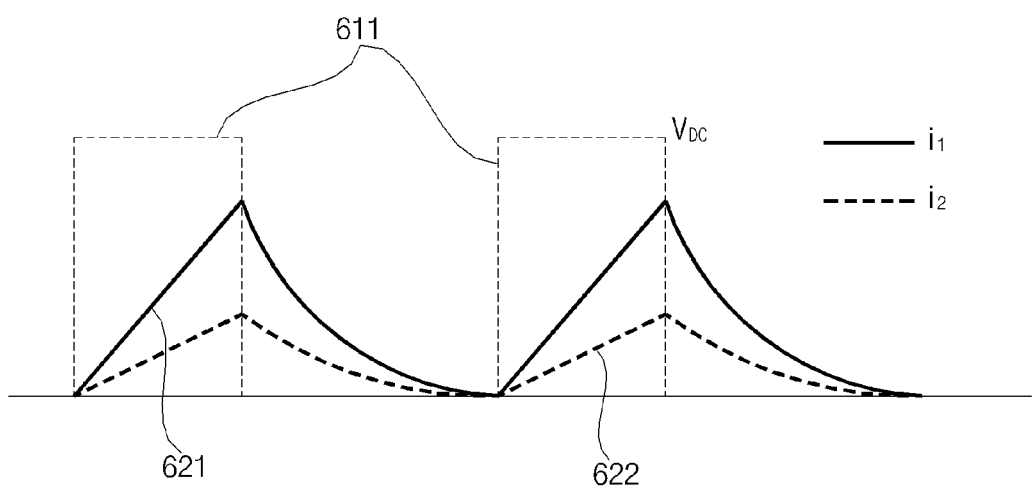
FIG. 23 is a diagram illustrating a first signal according to an embodiment of the present invention.

FIG. 23 is a diagram illustrating a first signal according to an embodiment of the present invention. Referring to FIG. 23, a DC power source is applied to the first coil unit 210. For example, a DC power source 611 of a square wave can be applied to the first coil unit 210.

If a metallic foreign object is present near the first coil unit 210, the current sensing unit 232 generates a signal of a waveform as indicated by reference numeral 621. If a metallic foreign object is not present near the first coil unit 210, the current sensing unit 232 generates a signal of a waveform as indicated by reference numeral 622.

In FIG. 22, since the metallic foreign object FO is present near any one 210a of the plural first coil units, the waveform as indicated by reference numeral 621 in FIG. 23 is obtained by the first sensor 232a. In FIG. 22, since the metallic foreign object FO is not present near the other one 210b of the plural first coil units, the waveform as indicated by reference numeral 622 in FIG. 23 is obtained by the second sensor 232b. The waveforms of FIG. 23 theoretically illustrate a specific situation and characteristics thereof in the presence or absence of a foreign object can be inverted according to an actual measurement process and physical properties of the foreign object to be detected.

Figure 24:
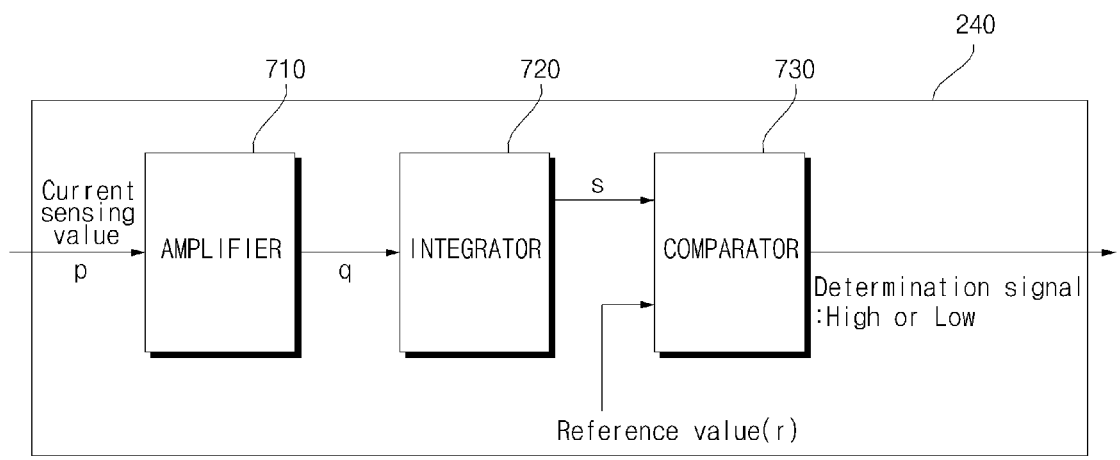
FIG. 24 is a diagram illustrating a signal processing unit according to an embodiment of the present invention.
Figure 25:
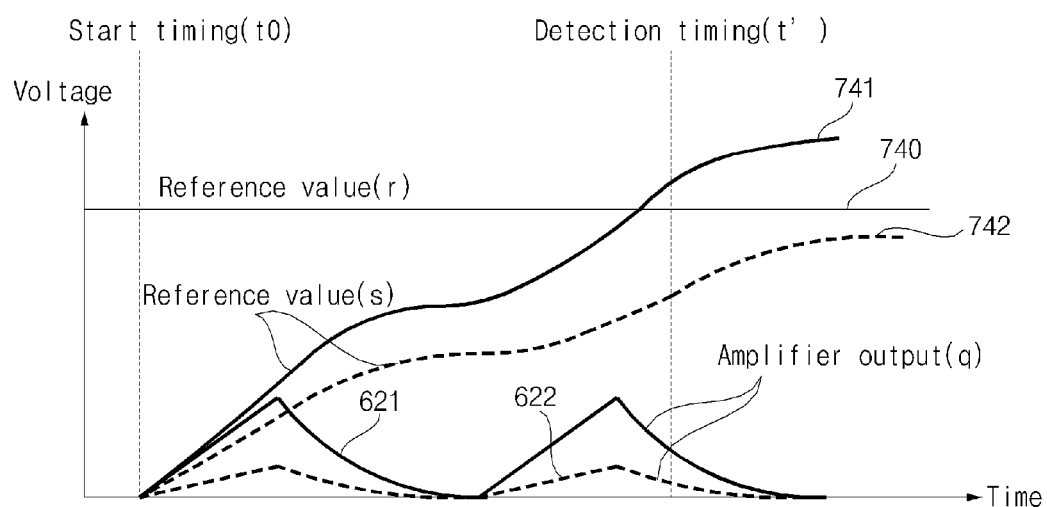
FIG. 25 is a diagram illustrating a signal processed by the signal processing unit of FIG. 24.

FIG. 24 is a diagram illustrating a signal processing unit according to an embodiment of the present invention, and FIG. 25 is a diagram illustrating a signal processed by the signal processing unit of FIG. 24. Referring to FIGS. 24 and 25, the signal processing unit 240 can generate the second signal by processing the first signal generated from the current sensing unit 232.

The signal processing unit 240 may include an amplifier 710, an integrator 720, and a comparator 730. The amplifier 710 can amplify the first signal and output the amplified signal. The amplifier 710 can filter noise of the first signal, and the first signal amplified by the amplifier 710 can be transmitted to the integrator 720.

The integrator 720 can perform integration on the first signal during a preset time, and output the second signal by performing integration on the first signal during a preset time. Reference numerals 741 and 742 indicate the second signal which is integrated during a preset time. Particularly, reference numeral 741 indicates the second signal when a foreign object is present near the first coil units 210 and reference numeral 742 indicates the second signal when a foreign object is not present near the first coil unit 210.

Since a current value of a detection coil becomes different according to whether a foreign object is present, a rate at which output of the integrator reaches a reference value differs. If this characteristic is used, a foreign object can be detected by setting a proper reference value.

Upon comparing the output signal of the integrator according to whether a foreign object is present, if a foreign object is present (reference numeral 741) at a detection timing t', the integrator outputs a voltage above a reference value 740, whereas if a foreign object is not present (reference numeral 742), the integrator outputs a voltage less than the reference value 740 at the detection timing. Sensitivity of a foreign object detection circuit can be adjusted by adjusting the reference value 740 and the detection timing (calibration process).

The waveforms of FIG. 25 theoretically illustrate a specific situation and characteristics thereof in the presence or absence of a foreign object can be inverted according to an actual measurement process and physical properties of the foreign object to be detected. The comparator 730 can compare the output value 741 of the integrator 720 with the reference value 740.

The comparator 730 can generate a third signal when the output value 741 of the integrator 720 is above the reference value 740. Upon receiving the third signal, the processor 271 can determine that a metallic foreign object is present near the first coil unit 210. The comparator 730 can generate a fourth signal when the output value 741 of the integrator 720 is less than the reference value 740.

Upon receiving the fourth signal, the processor 271 can determine that the metallic foreign object is not present near the first coil units 210. In addition, the reference value 740 can be a value set by a test for current flowing into the first coil unit 210 when a foreign object is not present. The reference value 740 can be set based on a value obtained by performing integration on a signal of current flowing into the first coil unit 210 during a preset time. Through the above detection scheme, even a minute difference in a current value which varies due to presence of a foreign object can be detected by integration, so that sensitivity of foreign object detection can be increased.

Figure 26:
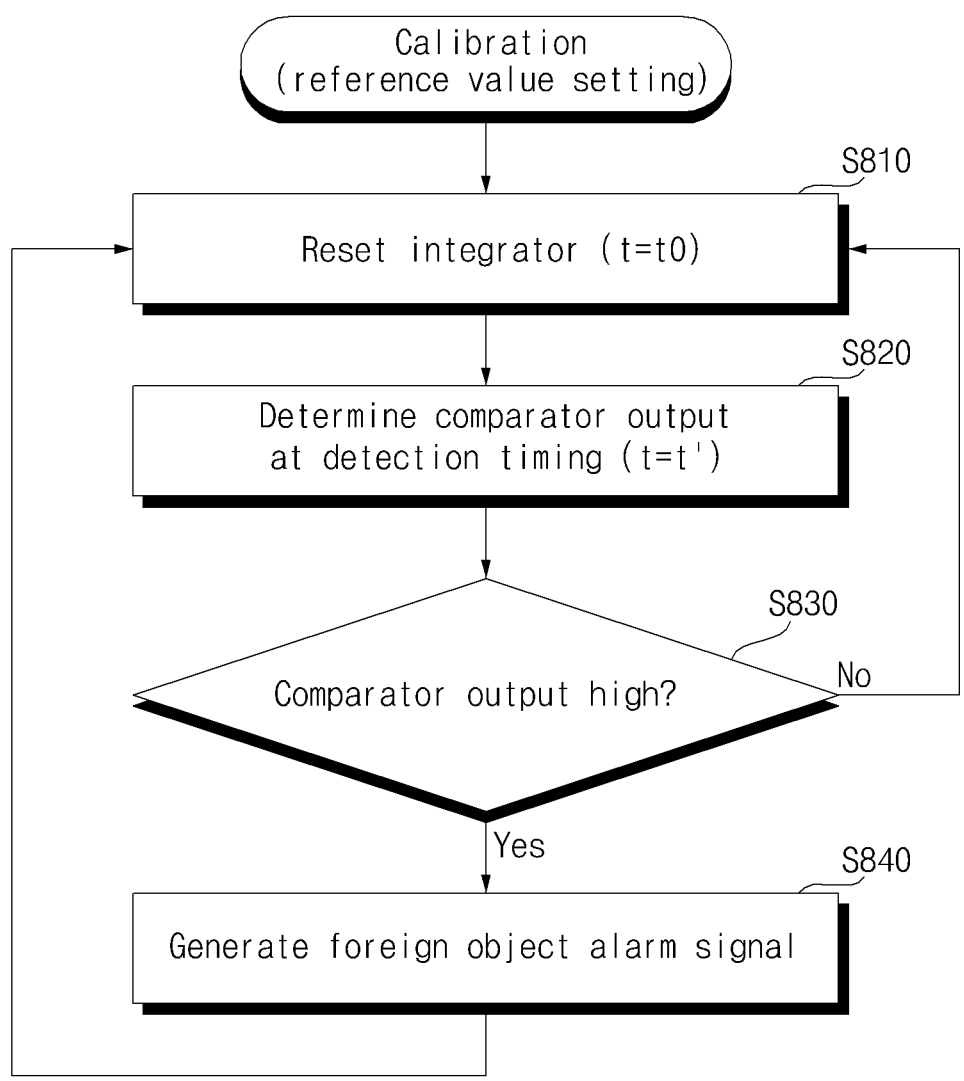
FIG. 26 is a flowchart illustrating an operation of a foreign object detection apparatus according to an embodiment of the present invention.

Next, FIG. 26 is a flowchart illustrating an operation of a foreign object detection apparatus according to an embodiment of the present invention. Referring to FIG. 26, the processor 271 can perform calibration and set a reference value. The processor 271 can perform an operation of resetting the integrator 720 (S810).

The foreign object detection scheme using the integrator 720 must perform a reset operation before and after detection in order to prevent an output signal of the integrator 720 from being saturated (e.g., a phenomenon in which a maximum value of the output signal of the integrator 720 is limited to a supply voltage). At a detection timing t' after a predetermined time after a resetting timing $t_0$ of the integrator, the comparator 730 can generate the fourth signal (e.g., a low signal) in the absence of a foreign object and generate the third signal (e.g., a high signal) in the presence of a foreign object) (S820).

In some embodiments, the third signal can be a low signal and the fourth signal can be a high signal. The processor 271 can determine whether a signal received from the comparator 730 is a high signal (S830). Upon determining that the received signal is a high signal, the processor 271 can generate a signal for alarm output (S840). Next, the processor 271 repeatedly performs a foreign object detection operation by resetting the integrator 720.

Figure 27:
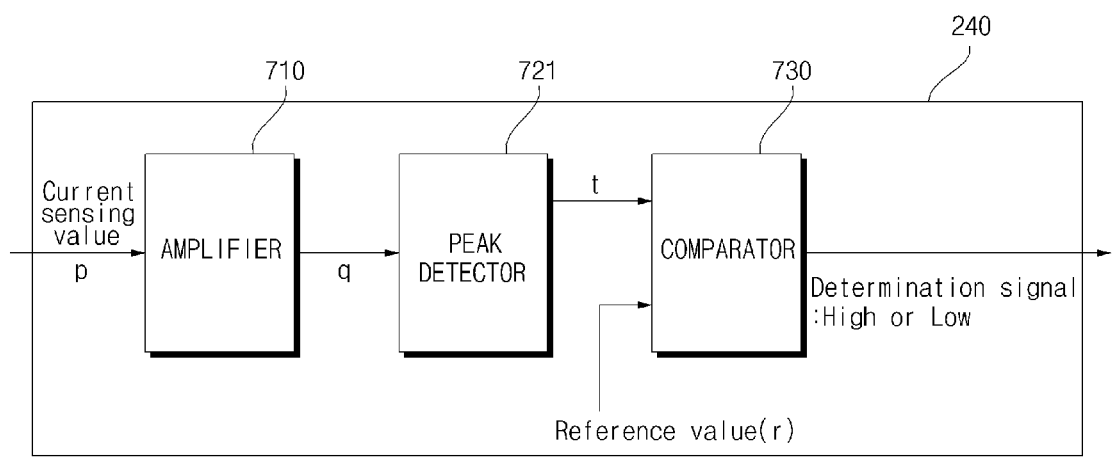
FIG. 27 is a diagram illustrating a signal processing unit according to an embodiment of the present invention.
Figure 28:
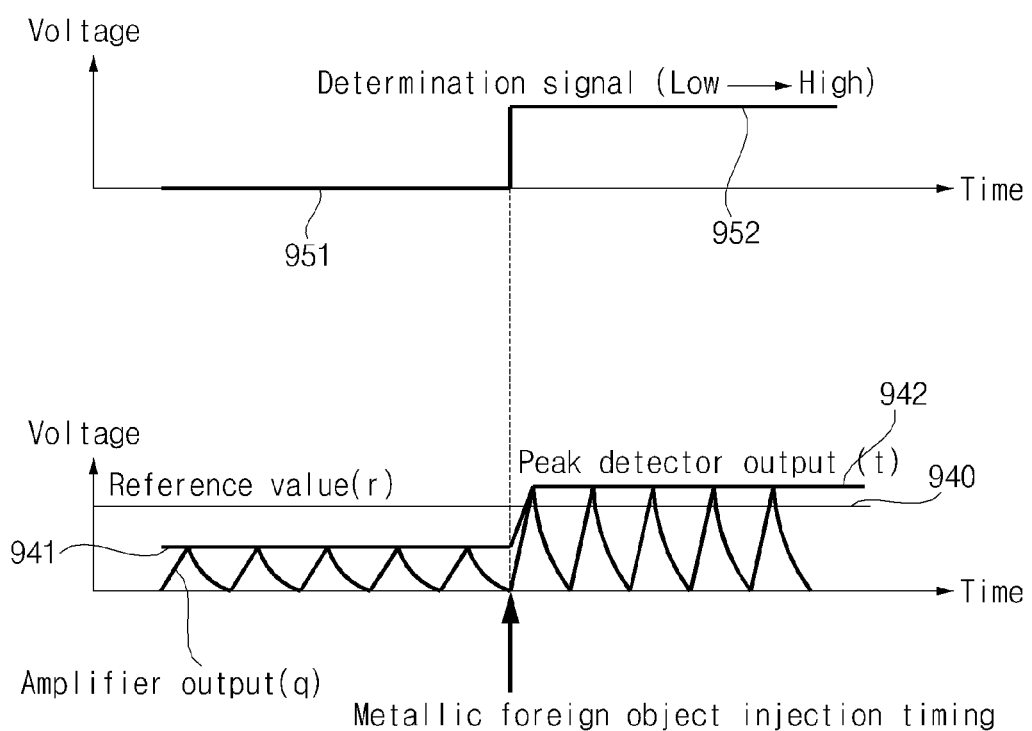
FIG. 28 is a diagram illustrating a signal processed in the signal processing unit of FIG. 27.

Next, FIG. 27 is a diagram illustrating a signal processing unit according to an embodiment of the present invention, and FIG. 28 is a diagram illustrating a signal processed in the signal processing unit of FIG. 27. Referring to FIGS. 27 and 28, the signal processing unit 240 can generate the second signal by processing the first signal generated from the current sensing unit 232.

The signal processing unit 240 may include the amplifier 710, a peak detector 721, and the comparator 730. The amplifier 710 can amplify the first signal and output the amplified signal. The amplifier 710 can also filter noise of the first signal, and the first signal amplified by the amplifier 710 can be transmitted to the peak detector 721.

Further, the peak detector 721 can detect a peak value of the first signal and generate the second signal by detecting the peak value of the first signal. Reference numerals 941 and 942 indicate the second signal generated by the peak detector 721. When a foreign object is present, since inductance of the first coil unit 210 varies, a peak value of a sensing value waveform also varies. Using this characteristic, a foreign object can be detected by setting a proper reference value.

The comparator 730 can compare the output values 941 and 942 of the peak detector 721 with a reference value 940. The comparator 730 can then generate the third signal when the output value 942 of the peak detector 721 is above the reference value 940. Upon receiving the third signal, the processor 271 can determine that a metallic foreign object is present near the first coil unit 210.

The comparator 730 can also generate the fourth signal when the output value 941 of the peak detector 721 is less than the reference value 940. Upon receiving the fourth signal, the processor 271 can determine that a metallic foreign object is not present near the first coil units 210. In addition, the reference value 740 can be a value set by a test for current flowing into the first coil unit 210 when a foreign object is not present. The reference value 940 can also be set based on a peak value of current flowing into the first coil unit 210.

Figure 29:
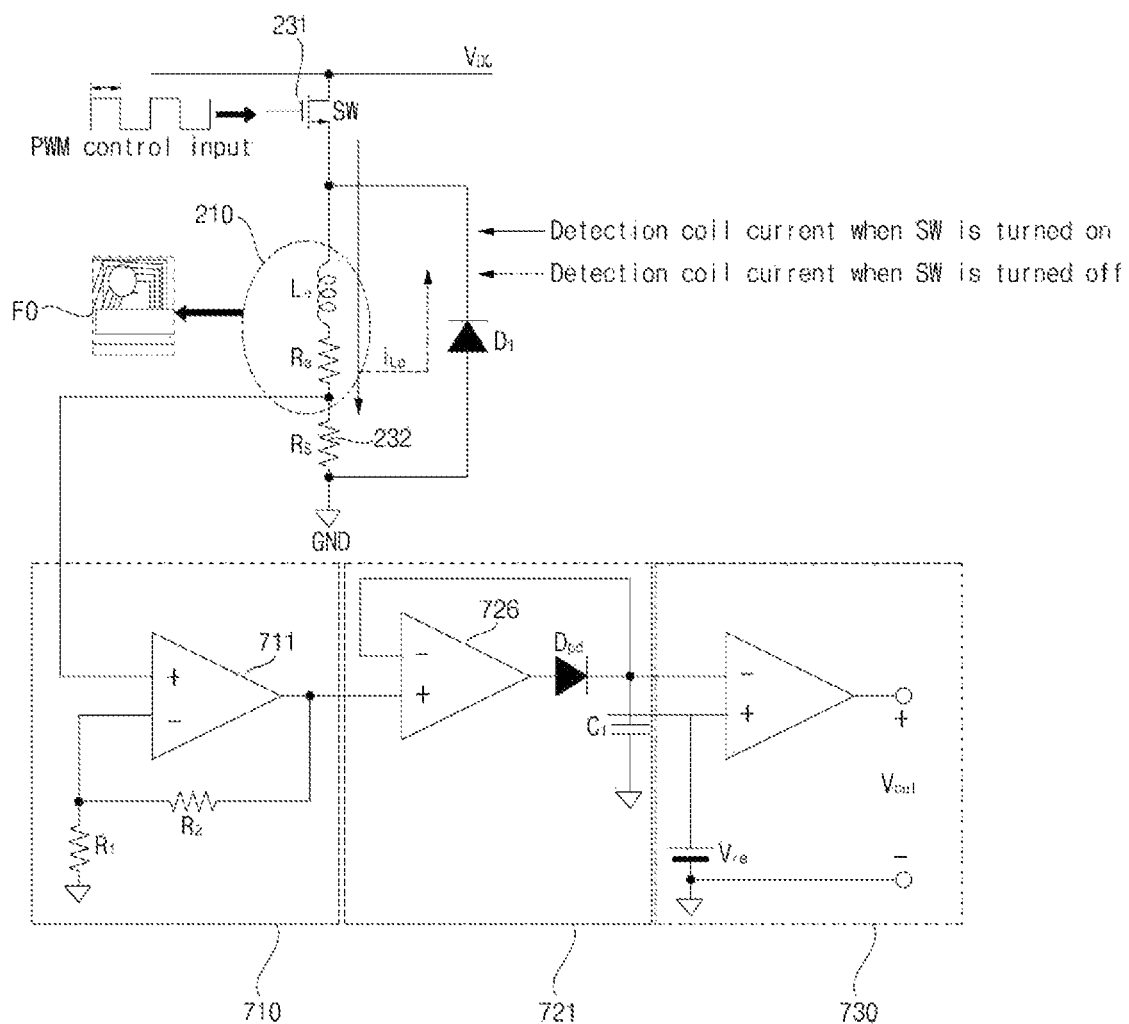
FIG. 29 is a circuit diagram of a foreign object detection apparatus including the signal processing unit of FIG. 27.

Next, FIG. 29 is a circuit diagram of a foreign object detection apparatus including the signal processing unit of FIG. 27. The foreign object detection apparatus of FIG. 29 is configured using an analog circuit. Referring to FIG. 29, the first coil unit 210 can be connected to or disconnected from a DC power voltage $V_{DC}$ through a MOSFET (switch (SW)) 231

If the switch 231 is turned off, current of a detection coil flows through a freewheeling diode $D_1$. A current sensing resistor $R_s$ 232 is connected to the detection coil in series and a voltage of both ends of the sensing resistor is input to the signal processing unit 240. The signal processing unit 240 includes two OP Amps and one comparator 730.

The amplifier 710 may include a first OP Amp 711, a first resistor $R_1$, and a second resistor $R_2$. The first OP Amp 711 amplifies a comparatively small current measurement value to the ratio of the first resistor $R_1$ and the second resistor $R_2$. If there is too much noise, a capacitor can be added to both ends of the first resistor $R_1$ or the second resistor $R_2$ so as to perform a filtering function. The peak detector 721 may include a second OP Amp 726, a diode Dpd, and a capacitor C1.

In some embodiments, when signal loss caused by a forward voltage of the diode Dpd is negligible (e.g., when a Schottky diode is used), the second OP Amp 726 can be removed from the peak detector 721 and a normal RCD peak detector circuit in which a resistor is connected to a capacitor C1 in parallel so as to have a sufficiently larger time constant than a switching period of the switch 231. The comparator 730 receives a reference value Vref through a + input terminal and generates a determination signal Vout after comparing the reference value Vref with an output signal of the peak detector 721.

Figure 30:
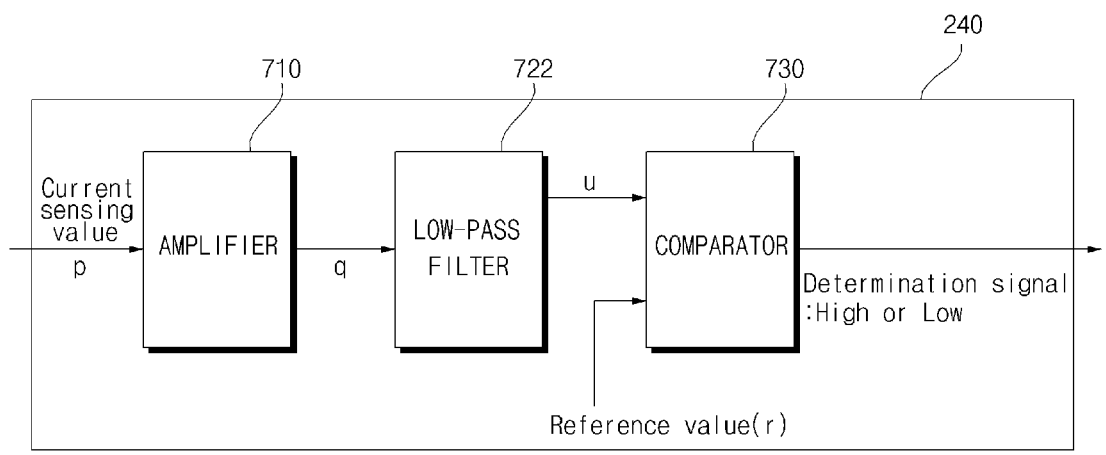
FIG. 30 is a diagram illustrating a signal processing unit according to an embodiment of the present invention.
Figure 31:
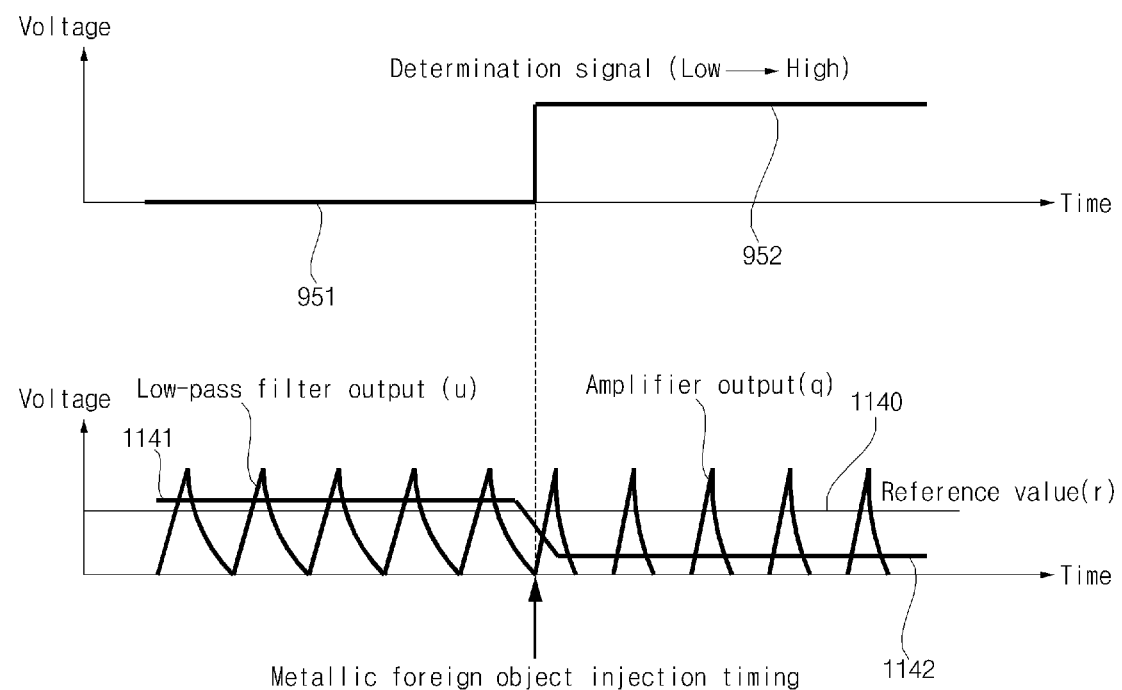
FIG. 31 is a diagram illustrating a signal processed in the signal processing unit of FIG. 30.

FIG. 30 is a diagram illustrating a signal processing unit according to an embodiment of the present invention, and FIG. 31 is a diagram illustrating a signal processed in the signal processing unit of FIG. 30. Referring to FIGS. 30 and 31, the signal processing unit 240 can generate the second signal by processing the first signal generated from the current sensing unit 232.

The signal processing unit 240 may include the amplifier 710, a low-pass filter 722, and the comparator 730. The amplifier 710 can output an amplification signal by amplifying the first signal. The amplifier 710 can also filter noise of the first signal. The first signal amplified by the amplifier 710 can then be transmitted to the low-pass filter 722.

Further, the low-pass filter 722 can extract an average value of the first signal and output the second signal by extracting an average value of the first signal. Reference numerals 1141 and 1142 indicate the second signal generated by the low-pass filter 722.

When a foreign object is present, an equivalent resistance of the first coil unit 210 is increased so that an average value of a sensing value waveform sensed by the current sensing unit 232 is lowered by the following equation:

$$\text{Average of currents of detection coil} = \frac{\text{valid input voltage}}{\text{equiavalent resistance of detection coil}}$$

The comparator 730 can compare the output values 1141 and 1142 of the low-pass filter 722 with a reference value 1140. The comparator 730 can then generate the fourth signal when the output value 1141 of the low-pass filter 722 is greater than the reference value 1140. Upon receiving the fourth signal, the processor 271 can determine that a metallic foreign object is not present near the first coil unit 210.

Further, the comparator 730 can generate the third signal when the output value 1142 of the low-pass filter 722 is less than the reference value 1140. Upon receiving the third signal, the processor 271 can determine that a metallic foreign object is present near the first coil unit 210. In addition, the reference value 740 can be a value set by a test for current flowing into the first coil unit 210 when a foreign object is not present. The reference value 1140 can be set based on an average value of currents flowing into the first coil units 210.

Figure 32:
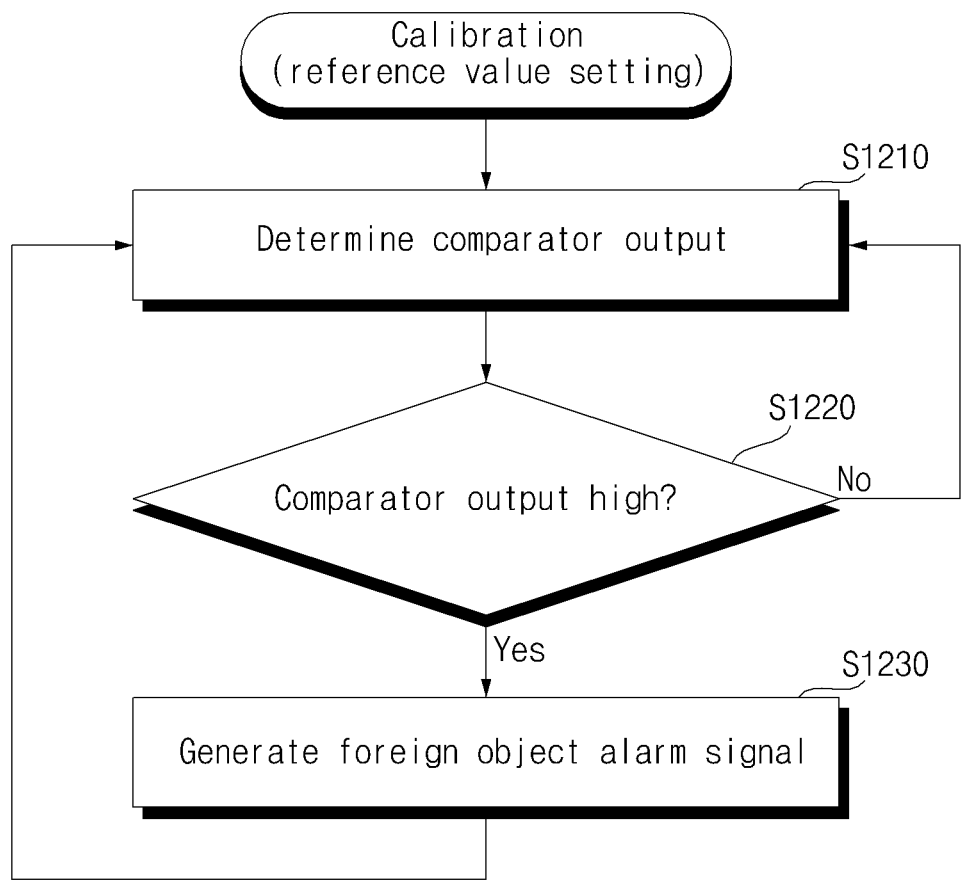
FIG. 32 is a flowchart illustrating an operation of a foreign object detection apparatus according to an embodiment of the present invention.

FIG. 32 is a flowchart illustrating an operation of a foreign object detection apparatus according to an embodiment of the present invention. Referring to FIG. 32, the processor 271 can perform calibration and set a reference value.

When a foreign object is not present, the comparator 730 can output the fourth signal (e.g., a low signal) and, when a foreign object is present, the comparator 730 can output the third signal (e.g., a high signal) (S1210). In some embodiments, the third signal can be a low signal and the fourth signal can be a high signal.

The processor 271 can determine whether a signal received from the comparator 730 is a high signal (S1231). Upon determining that the received signal is a high signal, the processor 271 can generate a signal for alarm output (S1232). Next, the processor 271 repeatedly performs a foreign object detection operation by resetting the integrator 720.

As is apparent from the above description, the embodiments of the present invention provide several advantages. First, a foreign object detection apparatus which is easy to install and is reasonable in cost can be provided. Second, since detection sensitivity is high, a small foreign object can be detected and the reliability of foreign object detection is raised. Third, foreign objects can be detected during charging or even during non-charging. Fourth, detection sensitivity is raised by offsetting a voltage which is induced during charging.

The effects of the present invention should not be limited to the aforementioned effects and other not-mentioned effects will be clearly understood by those skilled in the art from the claims. The present invention can be implemented as code that can be written on a computer-readable recording medium and thus read by a computer system. The computer-readable recording medium can be any type of recording device in which data is stored in a computer-readable manner. Examples of the computer-readable recording medium include a hard disk drive (HDD), a solid state drive (SSD), a silicon disk drive (SDD), a read only memory (ROM), a random access memory (RAM), a compact disk ROM (CD-ROM), a magnetic tape, a floppy disk, an optical data storage, and a carrier wave (e.g., data transmission over the Internet). The computer may include the processor 270 or the controller 170. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A foreign object detection apparatus, comprising:
   a plurality of object sensing devices positioned between a transmission pad and a reception pad of a wireless charging system; and
   a detection circuit configured to determine whether a foreign object is present between the transmission pad and the reception pad based on data received from the plurality of object sensing devices,
   wherein each of the plurality of object sensing devices includes
   a first coil unit wound with a first coil in a first direction, and
   a second coil unit wound with a second coil in a second direction different from the first direction,
   wherein the first coil unit and the second coil unit overlap each other,
   wherein an arrangement pattern of the plurality of object sensing devices is determined based on a shape of the transmission pad,
   wherein each of the plurality of object sensing devices includes a first object sensing device and a second object sensing device alternately disposed with the first object sensing device, and wherein the second object sensing device is disposed in a line with the first object sensing device, the first object sensing device is disposed such that the first coil unit is deposited on the second coil unit, and the second object sensing device is disposed such that the second coil unit is deposited on the first coil unit.

2. The foreign object detection apparatus of claim 1, wherein the first coil includes a larger number of windings than the second coil.

3. The foreign object detection apparatus of claim 1, wherein a first shape defined by windings of the first coil is smaller than a second shape defined by windings of the second coil.

4. The foreign object detection apparatus of claim 3, wherein a number of windings of the first coil is determined based on a value obtained by multiplying a ratio between an area of the first shape and an area of the second shape by a number of windings of the second coil.

5. The foreign object detection apparatus of claim 3, wherein the first shape and the second shape are polygons.

6. The foreign object detection apparatus of claim 3, wherein the first shape is a first quadrangle and the second shape is a second quadrangle larger than the first quadrangle.

7. The foreign object detection apparatus of claim 6, wherein a length of one side of the second quadrangle is twice a length of one side of the first quadrangle.

8. The foreign object detection apparatus of claim 3, wherein the first shape is different from the second shape.

9. The foreign object detection apparatus of claim 3, wherein the second coil unit is wound with the second coil in an outer region of the second shape, and is wound with the second coil to be separated from the first coil unit.

10. The foreign object detection apparatus of claim 9, wherein the second coil unit is wound with the second coil one to three times.

11. The foreign object detection apparatus of claim 1, wherein a number of windings of the first coil is determined by a location of the first coil unit on the transmission pad.

12. The foreign object detection apparatus of claim 11, wherein the number of windings of the first coil is larger when the first coil unit is disposed on a transmission coil of the transmission pad than when the first coil unit is not disposed on the transmission coil of the transmission pad.

13. The foreign object detection apparatus of claim 1, wherein the detection circuit determines whether the foreign object is present between the transmission pad and the reception pad based on a variation in impedance of the first coil unit.

14. The foreign object detection apparatus of claim 1, wherein the detection circuit determines whether the foreign object is present between the transmission pad and the reception pad based on an induced voltage generated in the object sensing devices.

15. The foreign object detection apparatus of claim 1,
wherein the first object sensing device and the second object sensing device are deposited on each other.

16. The foreign object detection apparatus of claim 15, wherein the detection circuit alternately operates the first object sensing device and the second object sensing device on a time division basis.

17. The foreign object detection apparatus of claim 3, wherein the second shape defined by windings of the second coil in the second coil unit is at least one of a hexagon or a triangle.

\* \* \* \* \*